United States Patent
Smith et al.

(10) Patent No.: US 9,383,621 B2
(45) Date of Patent: Jul. 5, 2016

(54) ELECTROPHORETIC FLUIDS

(71) Applicant: Merck Patent GmbH, Darmstadt (DE)

(72) Inventors: Ashley Nathan Smith, Southampton (GB); Mark John Goulding, Ringwood (GB)

(73) Assignee: Merck Patent GmbH, Darmstadt (DE)

( * ) Notice: Subject to any disclaimer, the term of this patent is extended or adjusted under 35 U.S.C. 154(b) by 0 days.

(21) Appl. No.: 14/361,456

(22) PCT Filed: Nov. 13, 2012

(86) PCT No.: PCT/EP2012/004707
§ 371 (c)(1),
(2) Date: May 29, 2014

(87) PCT Pub. No.: WO2013/079158
PCT Pub. Date: Jun. 6, 2013

(65) Prior Publication Data
US 2014/0313567 A1    Oct. 23, 2014

(30) Foreign Application Priority Data
Nov. 30, 2011   (EP) .................................. 11009485

(51) Int. Cl.
*G02B 26/00*   (2006.01)
*G09G 3/34*   (2006.01)
*G03G 17/04*   (2006.01)
*G02F 1/167*   (2006.01)
(Continued)

(52) U.S. Cl.
CPC .............. *G02F 1/167* (2013.01); *G02F 1/0009* (2013.01); *G02F 1/133514* (2013.01); *G02F 1/172* (2013.01); *G02F 2001/1672* (2013.01); *G02F 2001/1678* (2013.01); *G02F 2201/123* (2013.01); *G09G 3/2003* (2013.01); *G09G 3/344* (2013.01)

(58) Field of Classification Search
CPC ............ G02F 1/167; G02F 2001/1678; G02F 2001/1672; G02F 1/133514; G02F 1/172; G02F 1/0009; G02F 2201/123; G09G 3/344; G09G 3/2003
USPC ......... 359/296; 430/32–38, 42.1; 345/85, 107
See application file for complete search history.

(56) References Cited

U.S. PATENT DOCUMENTS

| 5,284,922 A | 2/1994 | Amano et al. |
| 5,380,362 A | 1/1995 | Schubert |

(Continued)

FOREIGN PATENT DOCUMENTS

| GB | 1234072 A | 6/1971 |
| GB | 1261350 A | 1/1972 |

(Continued)

OTHER PUBLICATIONS

Hernandez et al., "Novel Diacetylene- and Chromophore-Containing Polymers and their Secord Order Nonlinear Optical Properties", Mol. Cryst. Liq. Cryst., vol. 374, pp. 503-512 (2002).

(Continued)

*Primary Examiner* — Evelyn A Lester
(74) *Attorney, Agent, or Firm* — Drinker Biddle & Reath LLP

(57) ABSTRACT

This invention relates to electrophoretic fluids, the use of these fluids for the preparation of an electrophoretic display device, and electrophoretic displays comprising such fluids.

13 Claims, 13 Drawing Sheets

(51) Int. Cl.
*G02F 1/1335* (2006.01)
*G09G 3/20* (2006.01)
*G02F 1/00* (2006.01)
*G02F 1/17* (2006.01)

(56) References Cited

U.S. PATENT DOCUMENTS

| | | | |
|---|---|---|---|
| 5,403,518 | A | 4/1995 | Schubert |
| 5,783,614 | A | 7/1998 | Chen et al. |
| 6,194,488 | B1 | 2/2001 | Chen et al. |
| 6,956,690 | B2 | 10/2005 | Yu et al. |
| 7,038,655 | B2 | 5/2006 | Herb et al. |
| 7,052,766 | B2 | 5/2006 | Zang et al. |
| 7,110,162 | B2 | 9/2006 | Wu et al. |
| 7,170,670 | B2 | 1/2007 | Webber |
| 7,226,550 | B2 | 6/2007 | Hou et al. |
| 7,236,290 | B1 | 6/2007 | Zhang et al. |
| 7,247,379 | B2 | 7/2007 | Pullen et al. |
| 7,277,218 | B2 | 10/2007 | Hwang et al. |
| 7,304,634 | B2 | 12/2007 | Albert et al. |
| 7,349,147 | B2 * | 3/2008 | Chopra ............... G02B 26/026 345/107 |
| 7,502,161 | B2 * | 3/2009 | Chopra ............... G02F 1/167 359/245 |
| 7,652,656 | B2 * | 1/2010 | Chopra ............... G09G 3/344 345/107 |
| 8,072,675 | B2 * | 12/2011 | Lin ............... G09G 3/3446 345/107 |
| 8,786,935 | B2 * | 7/2014 | Sprague ............... G02F 1/167 345/107 |
| 8,810,899 | B2 * | 8/2014 | Sprague ............... G02F 1/167 359/296 |
| 2002/0180688 | A1 | 12/2002 | Drzaic et al. |
| 2005/0000813 | A1 | 1/2005 | Pullen et al. |
| 2007/0128352 | A1 | 6/2007 | Honeyman et al. |
| 2007/0268244 | A1 | 11/2007 | Chopra et al. |

FOREIGN PATENT DOCUMENTS

| | | |
|---|---|---|
| GB | 1262092 A | 2/1972 |
| GB | 2040978 A | 9/1980 |
| GB | 2438436 A | 11/2007 |
| JP | S59187061 A | 10/1984 |
| JP | S61004764 A | 1/1986 |
| WO | WO-9502848 A1 | 1/1995 |
| WO | WO-99/10767 A1 | 3/1999 |
| WO | WO-2004023195 A2 | 3/2004 |
| WO | WO-2005017046 A2 | 2/2005 |
| WO | WO-2007053012 A1 | 5/2007 |
| WO | WO-2008055846 A1 | 5/2008 |
| WO | WO-2010089057 A2 | 8/2010 |
| WO | WO-2010089058 A1 | 8/2010 |
| WO | WO-2010089059 A1 | 8/2010 |
| WO | WO-2010089060 A2 | 8/2010 |
| WO | WO-2012019704 A1 | 2/2012 |
| WO | WO-2013079158 A1 | 6/2013 |

OTHER PUBLICATIONS

International Search Report for PCT/EP2012/004707 dated Jan. 2, 2013.
International Search Report for PCT/EP2012/004585 dated Mar. 21, 2013.
International Preliminary Report on Patentability for PCT/EP2012/004585 issued Jun. 3, 2014.

* cited by examiner a*b* chart variation of xy coordinates during optical change from black to white Figure 8 variation in Y during optical change from black to white Figure 9
variation of xy coordinates during optical change from black to white
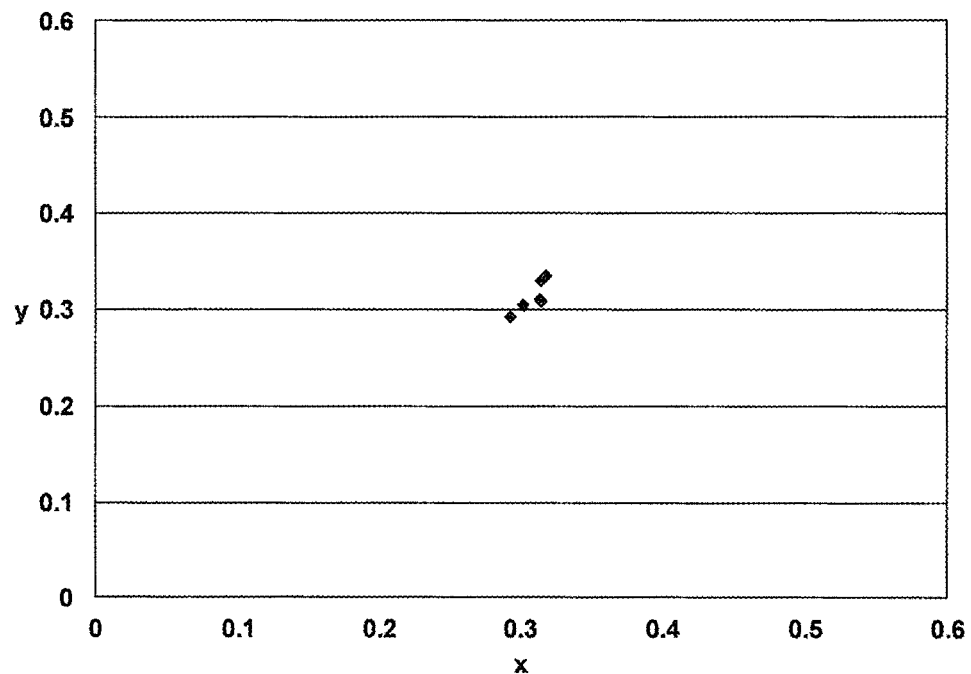
Figure 10 variation in Y during optical change from black to white
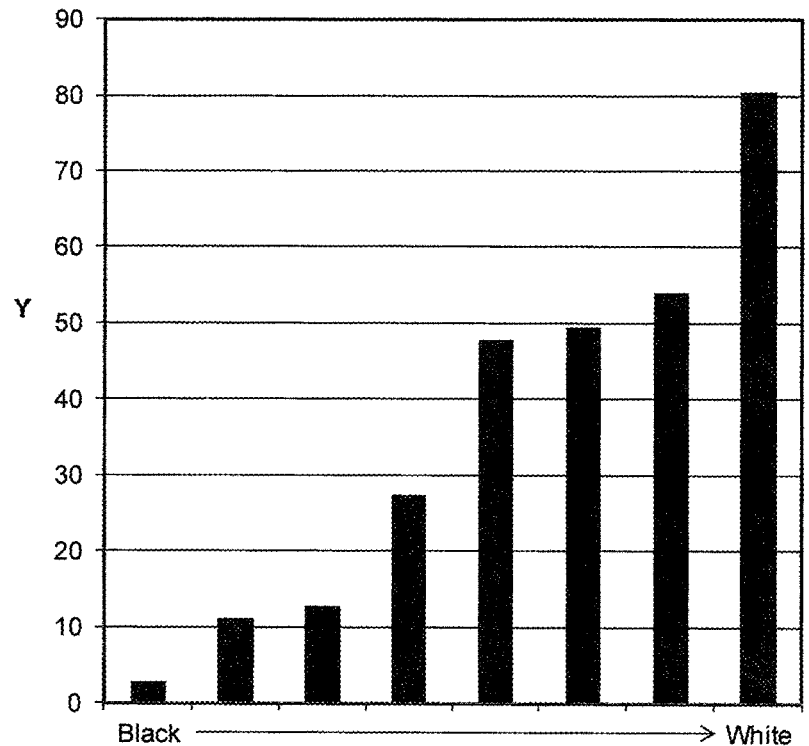

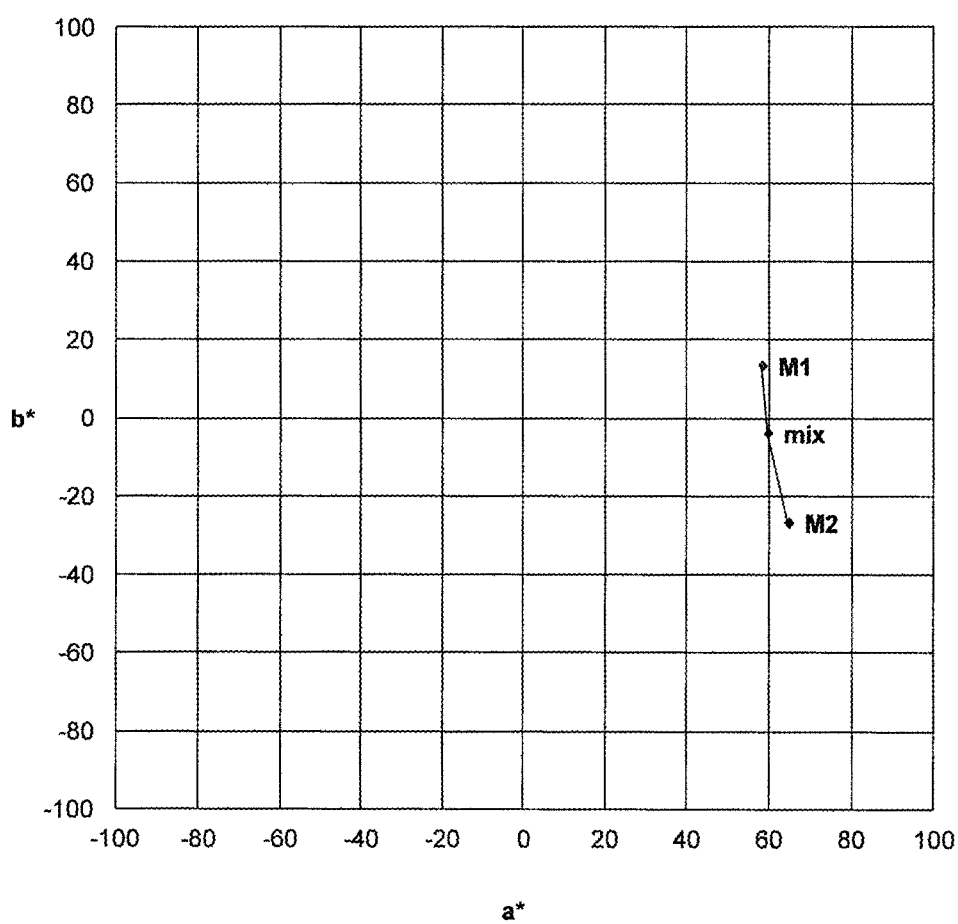

a*b* chart a*b* chart a*b* chart a*b* chart a*b* chart a*b* chart

ELECTROPHORETIC FLUIDS

CROSS-REFERENCE TO RELATED APPLICATIONS

This application is a national stage application (under 35 U.S.C. §371) of PCT/EP2012/004707, filed Nov. 13, 2012, which claims benefit of European Application No. 11009485.1, filed Nov. 30, 2011, both of which are incorporated herein by reference in their entirety.

BACKGROUND OF THE INVENTION

This invention relates to electrophoretic fluids, the use of these fluids for the preparation of an electrophoretic display device, and electrophoretic displays comprising such fluids.

In recent years a need has developed for low power, low cost and light weight display devices. EPDs (Electrophoretic Displays) can fulfil this requirement. One use of EPDs is for electronic paper. It is imperative that once an image is displayed, the image can be retained for a long period of time without further voltage being applied. Hence, this fulfils the requirements of low power use, and means an image can be visible until another image is required.

An EPD generally comprises charged electrophoretic particles dispersed between two substrates, each comprising one or more electrodes. The space between the electrodes is filled with a dispersion medium which is a different colour from the colour of the particles. If a voltage is applied between the electrodes, charged particles move to the electrode of opposite polarity. The particles can cover the observer's side electrode, so that a colour identical to the colour of the particles is displayed when an image is observed from the observer's side. Any image can be observed using a multiplicity of pixels.

Available technologies of EPDs include electronic paper, commercially used in electronic books. This application uses black and white colour. The use of different coloured particles in a single pixel has been exemplified in recent patent literature (U.S. Pat. No. 7,304,634, GB 2 438 436, US 2007/0268244). WO 2010/089057, WO 2010/089058, WO 2010/089059, and WO 2010/089060 describe coloured polymer particles for EPD.

Particles suitable for use in electrophoretic displays (EPD), e.g. coloured electronic paper have been exemplified in recent patent literature; e.g. (U.S. Pat. No. 7,304,634, GB 2 438 436, US 2007/0268244). It is now possible to control and manipulate features such as size, colour, charge and polydispersity independently to produce particles with desired properties for EPD; e.g. WO 2010089057. However, the colour properties are dictated by either dye chromophores or pigment shade as used in a particle. The concept of colour mixing is well known and understood. Typically, RGB or CMY colours are mixed to give other colours, for example, cyan and yellow mix to give green, and so on. This concept has been applied to EPD in terms of pixellated displays, or even in terms of mixing dyes prior to particle synthesis.

There is a requirement for colour particles of specific colour coordinates, which can be easily dispersed in nonpolar media, show electrophoretic mobility and which do not leach colour in a dispersant. To obtain a desired colour coordinate for a particle, the dye chromophores structure can be changed, or an alternative pigment found—however these solutions can be expensive, complex, and time consuming. In addition, some colours are difficult/impossible to achieve with a single dye chromophore and dye blending prior to synthesis causes complications with controlling dye incorporation and can require lengthy and expensive synthesis programs. There is a desire for electrophoretic display materials with improved colour tuning, for example to match a company logo colour, to enhance colour gamut, or to improve contrast ratio. Therefore, the object of this invention is to provide new electrophoretic display materials.

BRIEF SUMMARY OF THE INVENTION

This object is solved by an electrophoretic fluid according to claim 1 comprising a solvent or solvent mixture and at least two sets of particles having different colours, wherein the particles of the at least two sets of particles have the same electric charge sign and similar electrophoretic mobilities and wherein the particles of the at least two sets of particles having different colours behave as a single set of particles moving like a single set of particles in an electrical field. Furthermore, the object is solved by the use of such electrophoretic fluid for the preparation of a mono, bi or polychromal electrophoretic display device and by an electrophoretic display device comprising such an electrophoretic fluid.

BRIEF DESCRIPTION OF THE SEVERAL VIEWS OF THE DRAWING

FIGS. 7 and 9 show the variation of x,y coordinates during optical change from black to white.

FIGS. 8 and 10 show the variation in Y coordinates during optical change from black to white.

FIGS. 11-17 show the variation of x,y coordinates when particles of different colour coordinate are mixed.

DETAILED DESCRIPTION OF THE INVENTION

Figure 1:
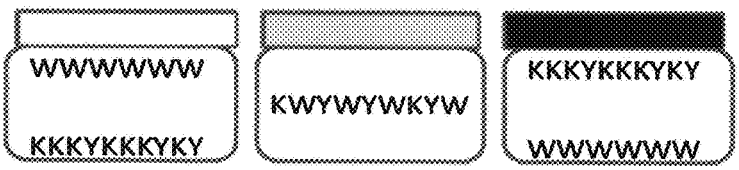
FIGS. 1-5 show some applications of multi-particle systems.

In a preferred embodiment of the invention the electrophoretic mobilities are within $5 \times 10^{-10}$ m$^2$/Vs of each other, preferably within $3 \times 10^{-10}$ m$^2$/Vs, and even more preferably within $1 \times 10^{-10}$ m$^2$/Vs. Preferably particles having different colours and electrophoretic mobilities within 25% of each other, and even more particles having electrophoretic mobilities within 10% of each other are used. Preferably, electrophoretic mobilities of particles with different colours differ at most 25%, especially 20%, of each other. Even more particles having electrophoretic mobilities that differ at most 10%, preferably 6%, of each other are advantageously used in the present invention, based on electrophoretic mobilities between $2 \times 10^{-10}$ m$^2$/Vs and $10 \times 10^{-10}$ m$^2$/Vs. In a most preferred variant of the invention particles having substantially equal electrophoretic mobilities are used. Electrophoretic mobilities are preferably measured using Malvern NanoZS Zetasizer equipment, or imaging microscopy. Preferably, particle mobilities are measured in the same solvent. The particles are preferably dispersed in dodecane with the same suitable charge control agent (CCA). In the particles of this invention, Span 85 or AOT provide positive and negative charge to the particles respectively. The concentration of the CCA can range between 0.1-30% dependent on particle concentration. A Nikon LV-100 microscope is preferably used for imaging microscopy to image the particle movement. By moving the particles between two inplane electrodes, and recording the images, the different coloured particles are individually observed, and the electrophoretic mobility of all particles is observed.

This invention relates to the fine colour tuning of electrophoretic display colour states by mixing particles incorporated with various dyes or pigments.

These multi-particle systems typically contain a multitude of particle sets, but behave as single or dual particle fluids.

It is important that the particles behave as a single particle when consistent gray scale is required. However, there may also be advantages to using particles of slightly different electrophoretic mobilities to generate unique visual effects. However, the focus of this invention is on particles which when mixed, behave as a single entity and provide consistent colour and greyscale as would be required for a typical electrophoretic display.

The present invention provides a cheap and efficient alternative to state of the art methods by using already available and it provides highly coloured and tuned particle dispersions suitable for EPD. In the design and preparation of particle dispersions for EPD, it is important to be able to manipulate colour in order to produce particle dispersions with all the desired features for EPD. For example, some colour shades are not available when using pigments. By the present invention, a much greater range of colours can be achieved. Even colours which are very difficult to realise by other methods— for example a neutral absorbing black, or a good green—can be easily realised by the present method.

As well as the colour of the particle, the electrophoretic mobility of the particle must be controlled. In a preferred embodiment of the invention, a particle set is used where the colour is changed, with no effect on charge/EP mobilities of the particle. Such particles are exemplified in WO2010/089057. These coloured polymer particles can preferably be prepared by copolymerisation in a non-aqueous, non-polar solvent of a polymerisable dye, methyl methacrylate (MMA), methacrylic acid, stabiliser, and initiator.

Mixing colour particles according to the invention instead of designing and mixing dyes has several advantages. By using dyes already available, particles can be synthesised and mixed to obtain colour coordinates much more efficiently and cheaply compared to expensive and time consuming dye design. Some colours are very difficult to realise with single dye chromophores—for example a neutral absorbing black, or a good green. By mixing colour particles, a more neutral black can be easily realised, or improved colour. Some colour shades are not available when using pigments. A much greater range of colours can be achieved by mixing colour particles.

The new multi-particle dispersions behave as single or dual particle dispersions. Particles of different electrophoretic mobilities can be used to create interesting optical effects, or 3 colour state pixels, e.g. Red-Magenta-Blue 3 state pixels, but preferably, particles should show identical charge behaviour and similar electrophoretic mobilities to avoid unwanted colour transitions and enable smooth greyscale levels.

Figure 2:
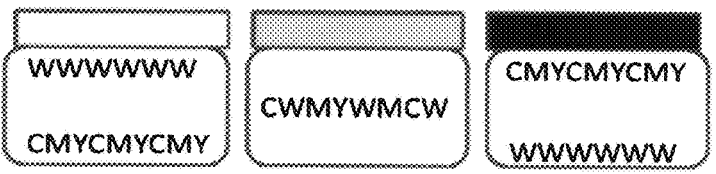
Figure 3:
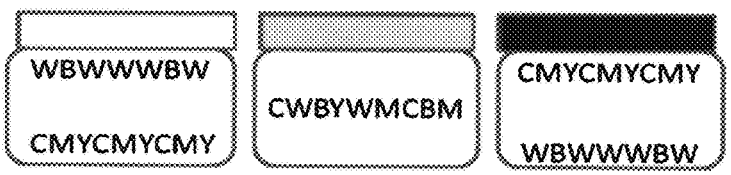
Figure 5:
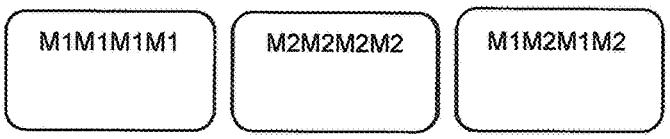

Some examples of applications of multi-particle systems are shown in FIGS. 1-5 wherein C=Cyan, M=Magenta, Y=Yellow, R=Red, G=Green, B=Blue, W=White, K=Black, M1 and M2 symbolise two different shades of magenta. The examples include:

Black dyed particles with a bias towards blue, can be mixed with same-sign yellow particles to tune the L*a*b* colour coordinates to (0,0), i.e. pure black (FIG. 1);
Magenta particles of a particular chromaticity can be mixed with other magenta particles of a slightly different chromaticity, to fine tune the magenta colour coordinate, or to match e.g. a company logo (FIG. 5);
Cyan particles, magenta particles, and yellow particles can be mixed to give black (FIG. 2).
White particles can be added to increase luminance (FIG. 1-3).

These examples demonstrate that 3 dimensional manipulation of colour coordinate is possible by mixing various particles of different colour. In all of the above cases, a second counter particle (e.g. black or white) can be added to obtain a vertical switching optical effect, for example in the case of a mixed black/yellow tuned state as shown in FIG. 1 or in the case of a CMY mixed black state as shown in FIG. 2. Where the CMY particles are of same charge, for example −ve, and the white particles are of opposite charge, for example +ve, a black white dual particle optical effect can be achieved, with reliable gray levels.

Figure 4:
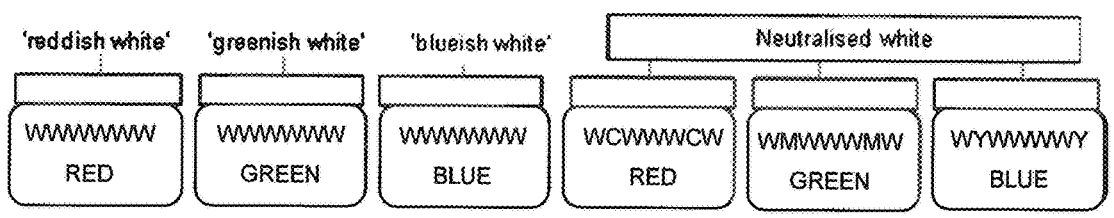

A known problem with some EPD systems is the contamination of white states with colour, either by coloured particles, the inherent impurity of white pigment, or from colour in the fluid. These issues can be improved by adding colour particles of the same charge as the single white particle. For example, if the white is slightly yellowed, a blue same-charge-sign particle can be added to tune the white state as shown in FIG. 3. In this example, 5 different particles are used in the material layer, to generate an optical effect equivalent to a known dual particle black/white system. The effect to the observer is of a two particle system. Where a single particle and dyed fluid are used to generate an optical effect, the dyed fluid is often still visible even when the single particle is at the front of the display. In a single particle+dye system, addition of a second colour particle can help 'neutralise' the white state as shown in FIG. 4. Where specific colours are required, for example for a company logo, particles of similar colour can be mixed to tune to a specific colour as shown in FIG. 5.

Furthermore, yellow particles can be mixed with the complementary colours (Cyan, Magenta) to lower the luminance (L*), at slight cost to colour saturation; (Cyan+Yellow=green, Magenta+Yellow=red. Red+green=(dark) yellow, so Cyan+Yellow+Magenta+Yellow=dark yellow).

All kinds of black, white, and/or coloured particles are suitable for the present invention, e.g. any particle containing either dye and/or pigment that can be manipulated by applying an electric field. These particles are known to any expert in the field. Typically white particles use $TiO_2$ as a reflective pigment, and black particles might typically be based on carbon black pigments. Colour pigments typically used could be Iron Oxide Red (Pigment Red 101), Molybdate Red (Pigment Red 104), Lead Oxide red (Pigment Red 105), Cadmium Red (Pigment Red 108), Oxide Red (PR102), Chromium Oxide Green (Pigment Green 17), Cadmium Green (PG14), Paris Green (PG21), Scheele's Green (PG22)

Milori Blue (Pigment Blue 27), Ultramarine Blue (Pigment Blue 29), Cobalt Blue (PB28) and Cerulean Blue (PB35), Han Blue $BaCuSi_4O_{10}$, Egyptian Blue (PB31), Prussian Blue (PB27)

Iron Oxide Black (Pigment Black 11) $Fe_3O_4$, Titanium Black, Chrome Yellow (Pigment Yellow 34), Zinc Yellow (Pigment Yellow 36), Cadmium Yellow (PY34), Iron Oxide (Pigment Yellow 34), Aureolin (PY40), Yellow Ochre (PY43), Naples Yellow (PY41), Titanium Yellow (PY53), Mosaic Gold (SnS2)

Orange Chrome Yellow (Pigment Orange 21), Cadmium Orange (PO20) Iron Oxide Brown (Pigment Brown 6), Raw Umber (PBr7), Raw Sienna (PBr7), Han Purple ($BaCuSi_2O_6$)

Preferably, coloured particles prepared according to WO 2010/089057, WO 2012/019704, WO 2010/089060 or WO 2011/154103 can be used, especially particles prepared according to WO 2010/089057 and WO 2012/019704.

Such coloured polymer particles usually comprising monomer units of a) at least one polymerisable dye comprising a chromophore, at least one polymerisable group, preferably at least two polymerisable groups, optionally fixed by at least one linker group, and optional groups to modify physical properties and optionally charged group(s), b) at least one monomer, c) optionally at least one charged co-monomer, and d) optionally at least one crosslinking co-monomer. These coloured polymer particles can preferably be prepared by copolymerisation in a non-aqueous, non-polar solvent, especially by copolymerisation of a polymerisable dye, methyl methacrylate (MMA), methacrylic acid, stabiliser, and initiator.

Preferably, the polymerisable dye or dyes are selected from azo dyes, metallised dyes, anthraquinone dyes, phthalocyanine dyes, benzodifuranones dyes, Brilliant Blue derivatives, pyrroline dyes, squarilium dyes, triphendioxazine dyes and mixtures of these dyes. Preferred polymerisable groups of the dye/dyes are methacrylate and acrylate groups.

Preferred polymerisable dyes are listed Table 1

TABLE 1

| Category/Description | Structure |
| --- | --- |
| Disperse bis-(methacrylate) | |
| Disperse bis-(methacrylate) | |
| Disperse bis-(methacrylate) | |
| Disperse bis-(acrylate) | |

TABLE 1-continued
| Category/Description | Structure |
|---|---|
| Methacrylated Disperse Red 1 | 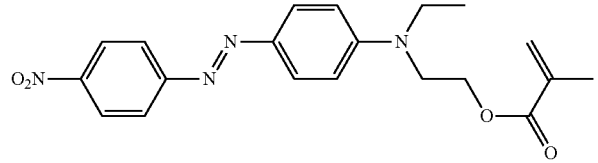 [SMILES: C=C(C)C(=O)OCCN(CC)c1ccc(/N=N/c2ccc([N+](=O)[O-])cc2)cc1] |
| Bis-acrylate of Disperse Red 19 | 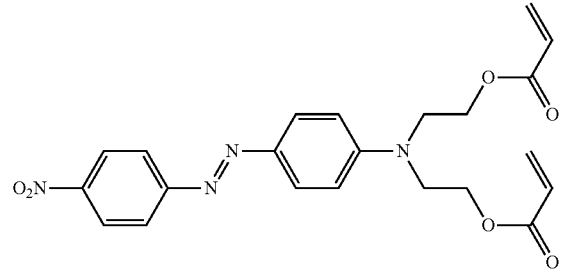 [SMILES: C=CC(=O)OCCN(CCOC(=O)C=C)c1ccc(/N=N/c2ccc([N+](=O)[O-])cc2)cc1] |
| Bis-methacrylate of Disperse Red 19 | 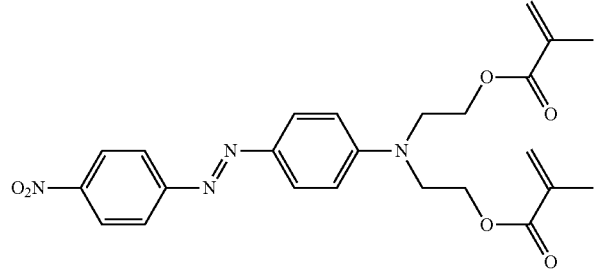 [SMILES: C=C(C)C(=O)OCCN(CCOC(=O)C(=C)C)c1ccc(/N=N/c2ccc([N+](=O)[O-])cc2)cc1] |
| Disperse bis-(methacrylate) | 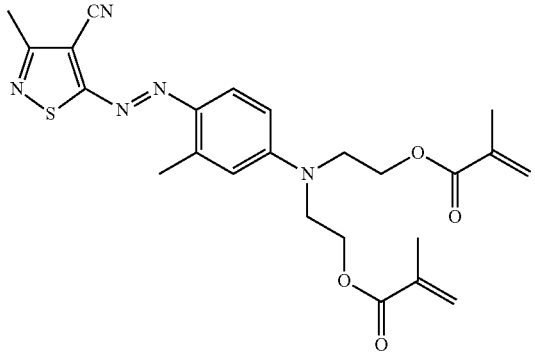 [SMILES: C=C(C)C(=O)OCCN(CCOC(=O)C(=C)C)c1ccc(/N=N/c2snc(C)c2C#N)c(C)c1] |
| Disperse bis-(methacrylate) | 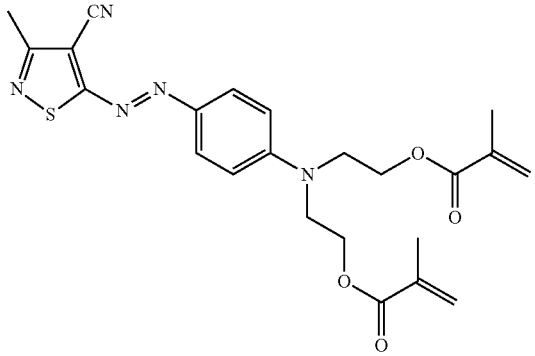 [SMILES: C=C(C)C(=O)OCCN(CCOC(=O)C(=C)C)c1ccc(/N=N/c2snc(C)c2C#N)cc1] |

TABLE 1-continued
| Category/Description | Structure |
|---|---|
| Disperse bis-(methacrylate) | 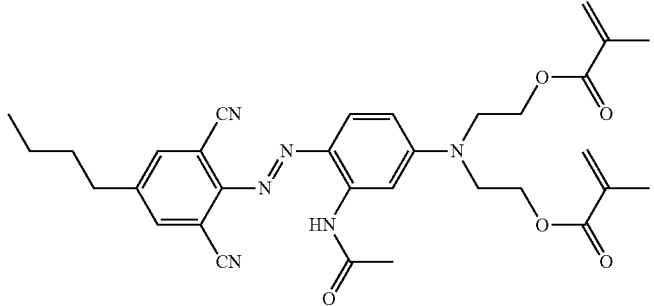 [SMILES: C=C(C)C(=O)OCCN(CCOC(=O)C(=C)C)c1ccc(/N=N/c2c(C#N)cc(CCCC)cc2C#N)c(NC(C)=O)c1] |
| Disperse bis-(methacrylate) | 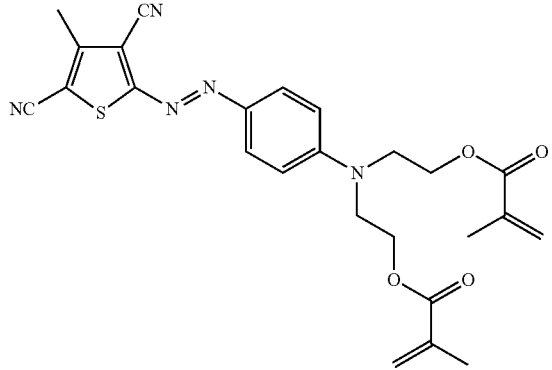 [SMILES: C=C(C)C(=O)OCCN(CCOC(=O)C(=C)C)c1ccc(/N=N/c2sc(C#N)c(C)c2C#N)cc1] |
| Disperse bis-(methacrylate) | 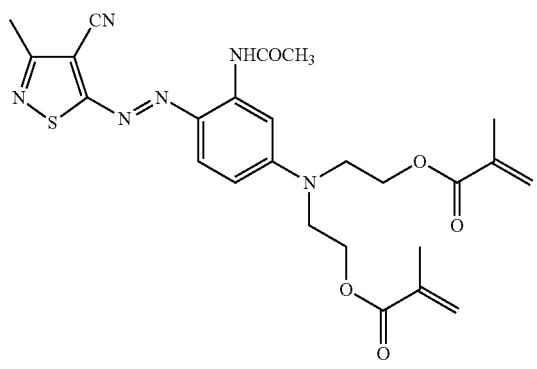 |
| Disperse bis-(methacrylate) | 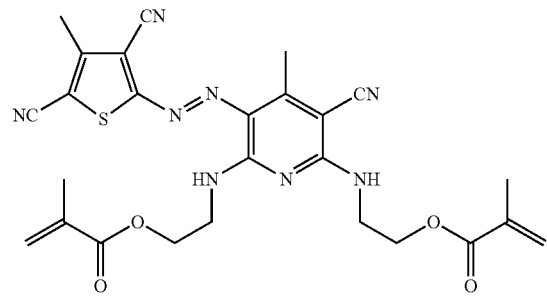 [SMILES: C=C(C)C(=O)OCCNc1nc(NCCOC(=O)C(=C)C)c(/N=N/c2sc(C#N)c(C)c2C#N)c(C)c1C#N] |

TABLE 1-continued
| Category/Description | Structure |
|---|---|
| Disperse bis-(methacrylate) | 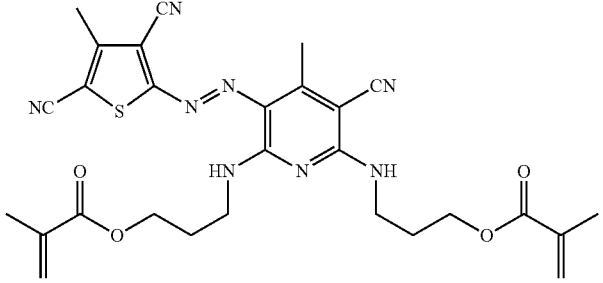 [SMILES: C=C(C)C(=O)OCCCNc1nc(NCCCOC(=O)C(=C)C)c(/N=N/c2sc(C#N)c(C)c2C#N)c(C)c1C#N] |
| Disperse bis-acrylate | 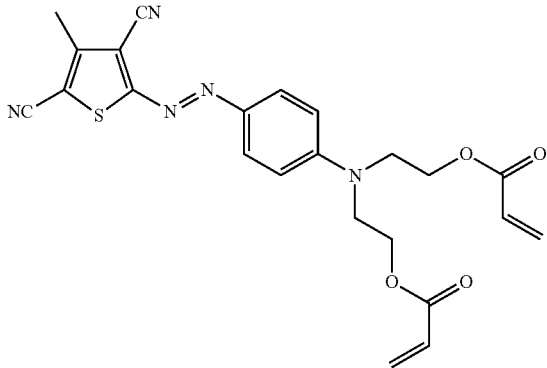 [SMILES: C=CC(=O)OCCN(CCOC(=O)C=C)c1ccc(/N=N/c2sc(C#N)c(C)c2C#N)cc1] |
| Disperse bis-acrylate | 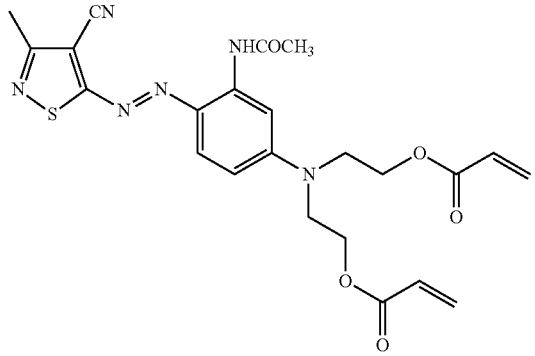 |
| Disperse bis-acrylate | 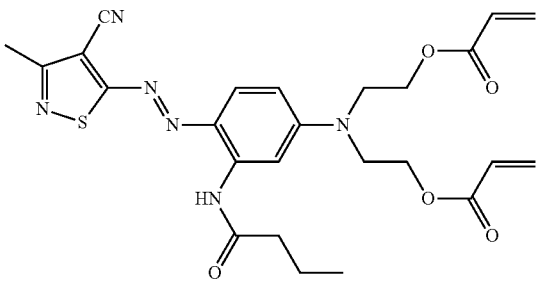 [SMILES: C=CC(=O)OCCN(CCOC(=O)C=C)c1ccc(/N=N/c2snc(C)c2C#N)c(NC(=O)CCC)c1] |

TABLE 1-continued

| Category/Description | Structure |
|---|---|
| Disperse bis-methacrylate | (structure of isothiazole-azo-phenyl with HN-C(O)-propyl and N(CH₂CH₂OC(O)C(Me)=CH₂)₂) |
| Disperse bis-acrylate | (structure of isothiazole-azo-phenyl with NHCOCH(CH₃)₂ and N(CH₂CH₂OC(O)CH=CH₂)₂) |
| copper phthalocyanine methacrylate | CuPc$\genfrac{}{}{0pt}{}{[3/6\text{-}SO_2\text{—}N(n\text{•}C_4H_9)C_2H_4O\text{—}CO\text{—}C(Me)=CH_2]_2}{[3/6\text{-}SO_2\text{—}N(n\text{•}C_4H_9)_2]_2}$ |
| copper phthalocyanine methacrylate | CuPc$\genfrac{}{}{0pt}{}{[3/6\text{-}SO_2\text{—}N(n\text{•}C_4H_9)C_2H_4O\text{—}CO\text{—}C(Me)=CH_2]_2}{[3/6\text{-}SO_2\text{—}N\{CH_2CH(Et)n\text{•}C_4H_9\}_2]_2}$ |
| copper phthalocyanine methacrylate | CuPc$\genfrac{}{}{0pt}{}{[3/6\text{-}SO_2\text{—}N(n\text{•}C_4H_9)C_2H_4O\text{—}CO\text{—}C(Me)=CH_2]_2}{[3/6\text{-}SO_2\text{—}N(n\text{•}C_6H_{13})_2]_2}$ |
| copper phthalocyanine methacrylate | CuPc$\genfrac{}{}{0pt}{}{[3/6\text{-}SO_2\text{—}N(n\text{•}C_4H_9)C_2H_4O\text{—}CO\text{—}C(Me)=CH_2]_2}{[3/6\text{-}SO_2\text{—}N(n\text{•}C_8H_{17})_2]_2}$ |
| Disperse Azo dimethacrylate | (structure: 4-nitro-2,6-dicyanophenyl-azo-phenyl with NHC(O)CH₃ and N(CH₂CH₂OC(O)C(Me)=CH₂)₂)  MB2 |

White charged inorganic particles such as titania, alumina or barium sulphate, coated with a surface layer to promote good dispersibility in dielectric media and a dielectric fluid media can be used in electrophoretic fluids according to the invention. Preferably, white particles synthesised according to WO 2011/154104 can be used.

Preferably, black particles synthesised according to earlier patent application EP2011/006912.7 can be used.

Such white and black, respectively polymer particles are prepared by a process comprising the steps of a) forming a reverse emulsion comprising at least one polymer, at least one white or black particle, at least one polar solvent, at least one non-polar solvent, and at least one surfactant and b) removing the polar solvent or polar solvents by evaporative methods. "Reverse emulsion" means that a non-polar solvent (preferably dodecane, or comparable aliphatic hydrocarbons)) forms the continuous phase and a polar solvent (preferably water) forms the discontinuous phase (internal phase). White particles used are especially titanium dioxide, zinc oxide, alumina, barium sulphate and/or tin dioxide, preferably titanium dioxide and/or zinc oxide, in particular titanium dioxide. Black particles used are preferably, black copper chromite pigment, black iron (III) oxide pigment, and carbon black pigments, in particular carbon black pigments. Polymers which are particularly suitable are those which are highly hydrophilic or are charged to render themselves hydrophilic, especially preferred are for example poly(vinyl pyrrolidone), poly(acrylamide), poly(acrylic acid) and poly(methacrylic acid).

Also preferred are black polymer particles comprising monomer units of at least one polymerisable dye according to Formula 1

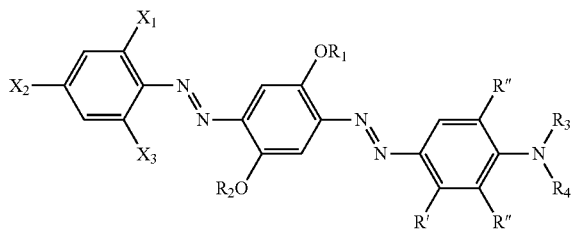

Formula (1)

Wherein
$X_1$, $X_2$, and $X_3$ are independently of one another H or an electron-withdrawing group;
$R_1$ and $R_2$ are independently of one another groups of the structure $L_1$-$Y_1$, $L_2$-$Y_2$ or linear, branched or cyclic alkyl groups;
$R_3$ and $R_4$ are independently of one another groups of the structure $L_3$-$Y_3$,
$L_4$-$Y_4$ or linear, branched or cyclic, substituted or unsubstituted alkyl groups where one or more non-adjacent carbon atoms may be replaced by O, S and/or N;
$L_1$, $L_2$, $L_3$, and $L_4$ are independently of one another linear or branched, substituted or unsubstituted alkylene groups where one or more non-adjacent carbon atoms may be replaced by O, S and/or N;

$Y_1$, $Y_2$, $Y_3$, and $Y_4$ are independently of one another polymerisable groups; in particular methacrylate and/or acrylate groups;
R' is a linear or branched alkyl group, $OR_5$, H, $NHCOR_6$ or $NHSO_2R_7$;
R'' is $OR_5$, H or $NHCOR_6$,
$R_5$, $R_6$, and $R_7$ are independently of one another linear or branched alkyl groups; and
Wherein at least one of $R_1$, $R_2$, $R_3$ and $R_4$ is a polymerisable group and at least one of $X_1$, $X_2$, and $X_3$ is an electron-withdrawing group. Such polymer particles are described in EPI 1009486.9. The term "electron-withdrawing group" is well known in the art and refers to the tendency of a substituent to attract valence electrons from neighbouring atoms; in other words the substituent is electronegative with respect to neighbouring atoms.

Especially preferred are polymerisable dyes with $X_2$ and one of $X_1$ and $X_3$ being $NO_2$, CN, Br, Cl, $SO_2NRR$ or $SO_2NHR$, preferably with R=methyl. Also preferred are polymerisable dyes with $X_2$ being $NO_2$, CN, Br, Cl, $SO_2NRR$ or $SO_2NHR$, preferably with R=methyl, and $X_1$ and $X_3$ being H.

In case that $R_1$ and $R_2$ are independently of one another linear, branched or cyclic alkyl groups, $R_1$ and $R_2$ are C2-C8 alkyl groups. If $R_1$ and $R_2$ are independently of one another groups of the structure $L_1$-$Y_1$ or $L_2$-$Y_2$, preferably $L_1$ and $L_2$ are independently of one another linear or branched C1-C10 alkylene groups. Especially groups where Y1 and Y2 are methacrylate or acrylate are preferred. Especially groups $Y_1$ and $Y_2$ are identical.

In case that $R_3$ and $R_4$ are independently of one another linear, branched or cyclic alkyl groups, $R_3$ and $R_4$ are C2-C8 alkyl groups. If $R_3$ and $R_4$ are independently of one another groups of the structure $L_3$-$Y_3$ or $L_4$-$Y_4$, preferably $L_3$ and $L_4$ are independently of one another linear or branched C1-C10 alkylene groups. Especially groups where $Y_3$ and $Y_4$ are methacrylate or acrylate are preferred. Especially groups $Y_3$ and $Y_4$ are identical.

Preferably, R' is a linear or branched C1-C4 alkyl group or $OR_5$, H, $NHCOR_6$ or $NHSO_2R_7$ with $R_5$, $R_6$, and $R_7$ preferably independently of one another linear or branched C1-C4 alkyl groups. It is especially preferred to use polymerisable dyes with R'=$CH_3$ or $OCH_3$. Preferably, polymerisable dyes with R''=H are used. Preferred polymerisable dyes are in particular those dyes in which all variables have the preferred meanings.

Particular preference is given to polymerisable dyes according to Formulas (2) to (5):

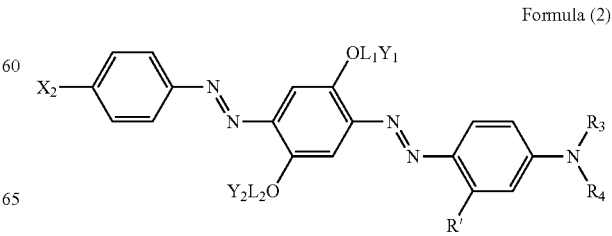

Formula (2)

Formula (3)
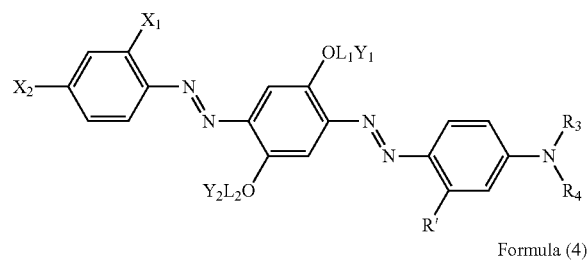
Formula (4)
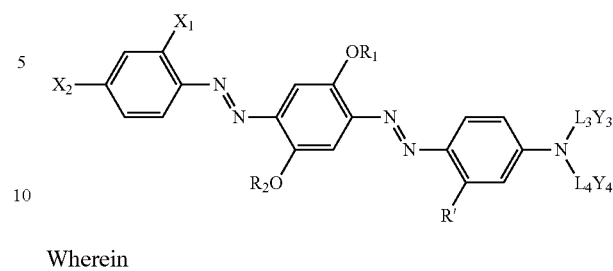
Formula (5)
Wherein
$X_1$ stands for $NO_2$ or CN;
$X_2$ stands for $NO_2$, CN or halogen;
$L_1, L_2, L_3,$ and $L_4$ stand for C2-C10 alkylene;
$Y_1, Y_2, Y_3,$ and $Y_4$ stand for methacrylate or acrylate;
$R_1, R_2, R_3,$ and $R_4$ stand for C2-C10 alkyl, and
R' stands for $CH_3$ or $OCH_3$.
Preferred examples are listed in Table 2. Particularly preferred are Dye 1, Dye 2, and Dye3.
TABLE 2
Dye 1
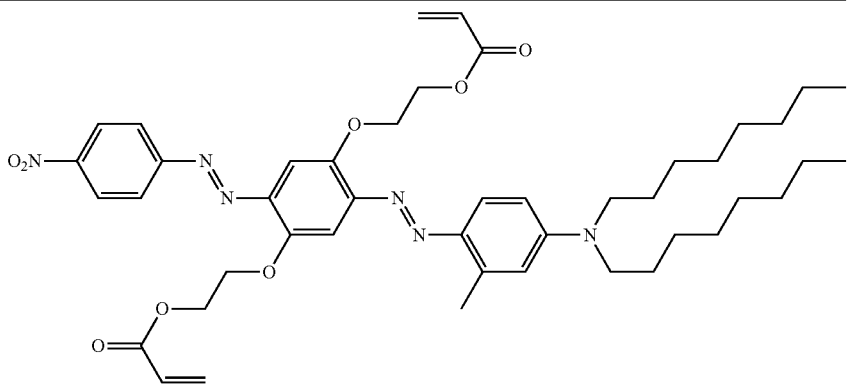
Dye 2
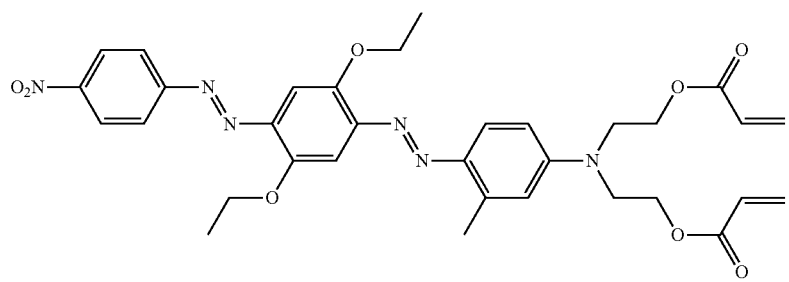 [SMILES: C=CC(=O)OCCN(CCOC(=O)C=C)c1ccc(/N=N/c2cc(OCC)c(/N=N/c3ccc([N+](=O)[O-])cc3)cc2OCC)c(C)c1]
Dye 3
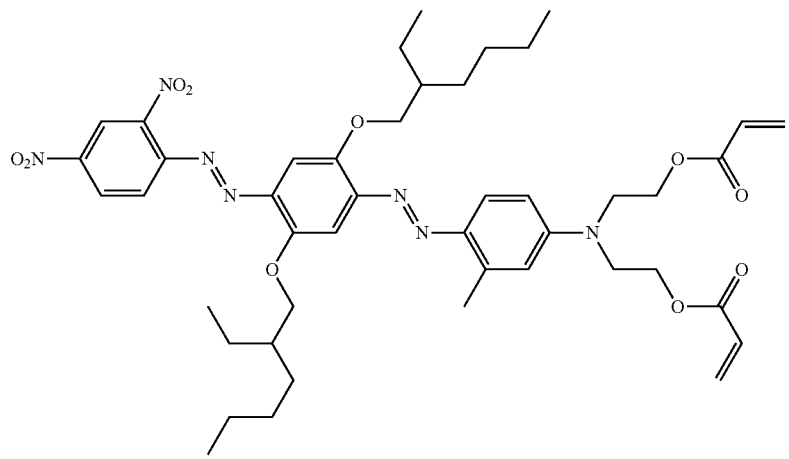 [SMILES: C=CC(=O)OCCN(CCOC(=O)C=C)c1ccc(/N=N/c2cc(OCC(CC)CCCC)c(/N=N/c3ccc([N+](=O)[O-])cc3[N+](=O)[O-])cc2OCC(CC)CCCC)c(C)c1]

TABLE 2-continued
Dye 4
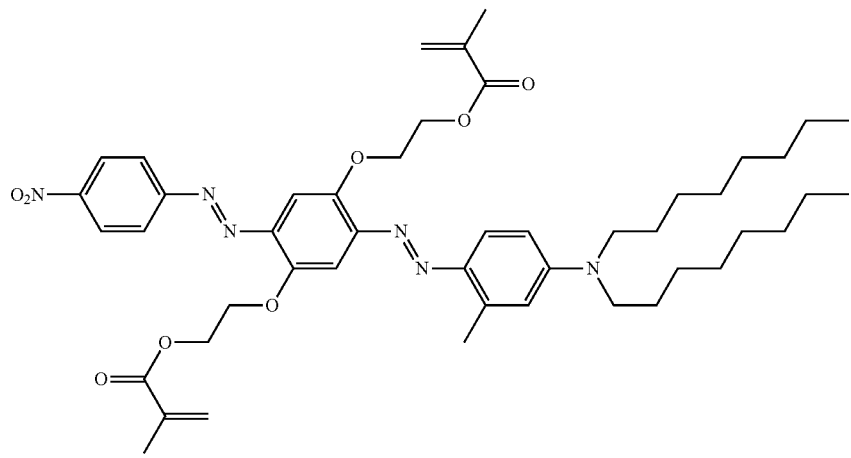 [SMILES: C=C(C)C(=O)OCCOc1cc(/N=N/c2ccc(N(CCCCCCCC)CCCCCCCC)cc2C)c(OCCOC(=O)C(=C)C)cc1/N=N/c1ccc([N+](=O)[O-])cc1]
Dye 5
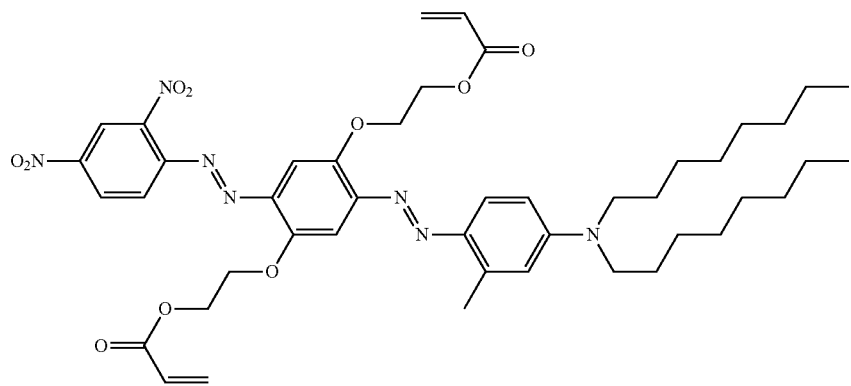 [SMILES: C=CC(=O)OCCOc1cc(/N=N/c2ccc([N+](=O)[O-])cc2[N+](=O)[O-])c(OCCOC(=O)C=C)cc1/N=N/c1ccc(N(CCCCCCCC)CCCCCCCC)cc1C]
Dye 6
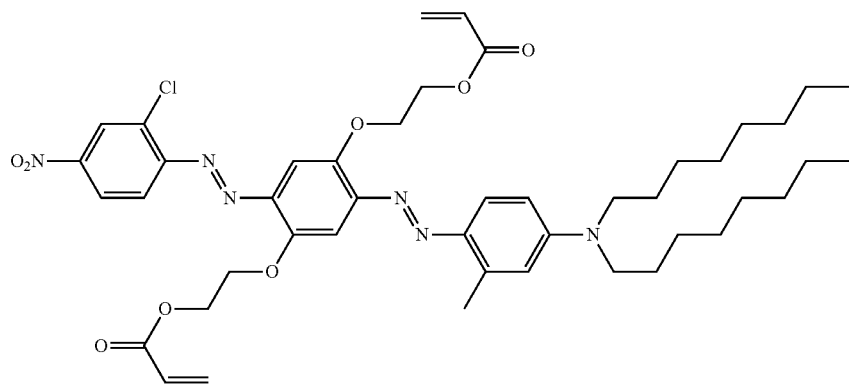 [SMILES: C=CC(=O)OCCOc1cc(/N=N/c2ccc([N+](=O)[O-])cc2Cl)c(OCCOC(=O)C=C)cc1/N=N/c1ccc(N(CCCCCCCC)CCCCCCCC)cc1C]
Dye 7
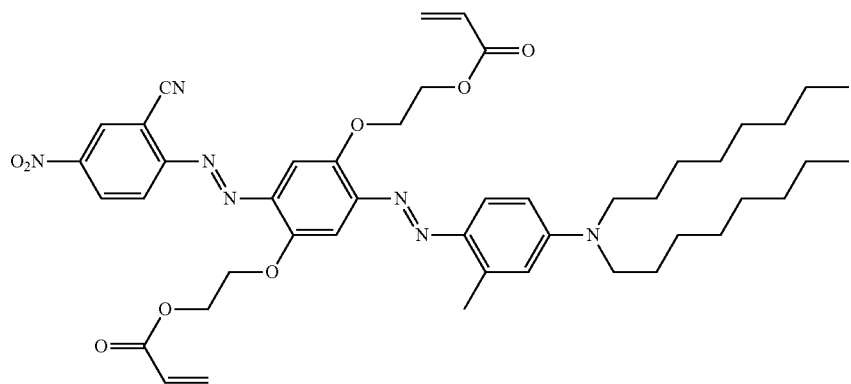 [SMILES: C=CC(=O)OCCOc1cc(/N=N/c2ccc([N+](=O)[O-])cc2C#N)c(OCCOC(=O)C=C)cc1/N=N/c1ccc(N(CCCCCCCC)CCCCCCCC)cc1C]

TABLE 2-continued
Dye 8
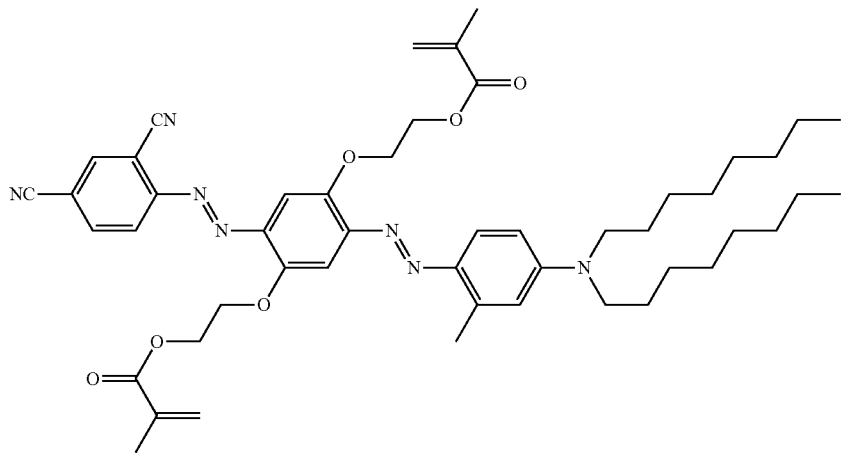 [SMILES: C=C(C)C(=O)OCCOc1cc(/N=N/c2ccc(C#N)cc2C#N)c(OCCOC(=O)C(=C)C)cc1/N=N/c1ccc(N(CCCCCCCC)CCCCCCCC)cc1C]
Dye 9
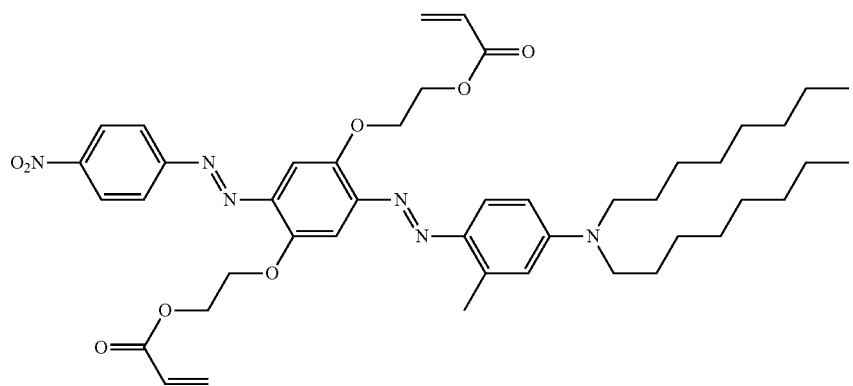 [SMILES: C=CC(=O)OCCOc1cc(/N=N/c2ccc(N(CCCCCCCC)CCCCCCCC)cc2C)c(OCCOC(=O)C=C)cc1/N=N/c1ccc([N+](=O)[O-])cc1]
Dye 10
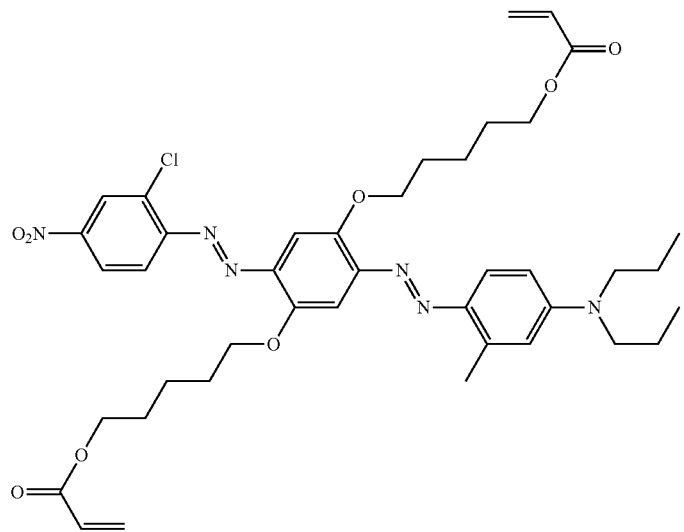 [SMILES: C=CC(=O)OCCCCCOc1cc(/N=N/c2ccc([N+](=O)[O-])cc2Cl)c(OCCCCCOC(=O)C=C)cc1/N=N/c1ccc(N(CCC)CCC)cc1C]

TABLE 2-continued
Dye 11
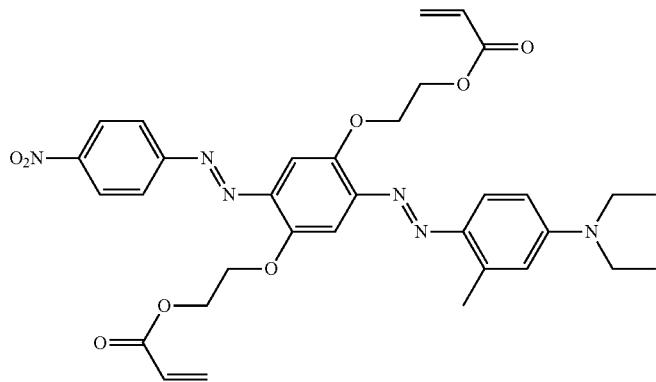 [SMILES: C=CC(=O)OCCOc1cc(/N=N/c2ccc(N(CC)CC)cc2C)c(OCCOC(=O)C=C)cc1/N=N/c1ccc([N+](=O)[O-])cc1]
Dye 12
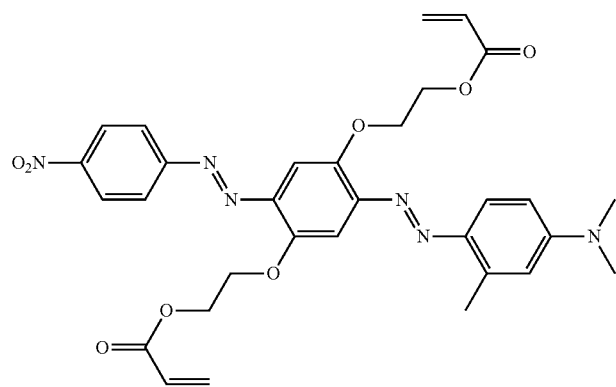 [SMILES: C=CC(=O)OCCOc1cc(/N=N/c2ccc(N(C)C)cc2C)c(OCCOC(=O)C=C)cc1/N=N/c1ccc([N+](=O)[O-])cc1]
Dye 13
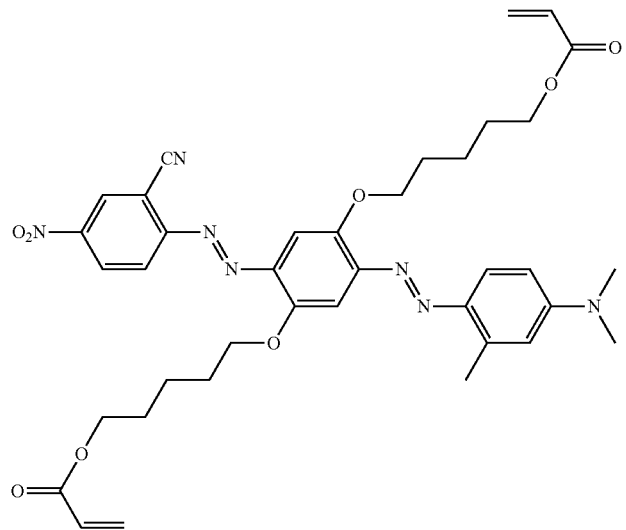 [SMILES: C=CC(=O)OCCCCCOc1cc(/N=N/c2ccc([N+](=O)[O-])cc2C#N)c(OCCCCCOC(=O)C=C)cc1/N=N/c1ccc(N(C)C)cc1C]

TABLE 2-continued
Dye 14
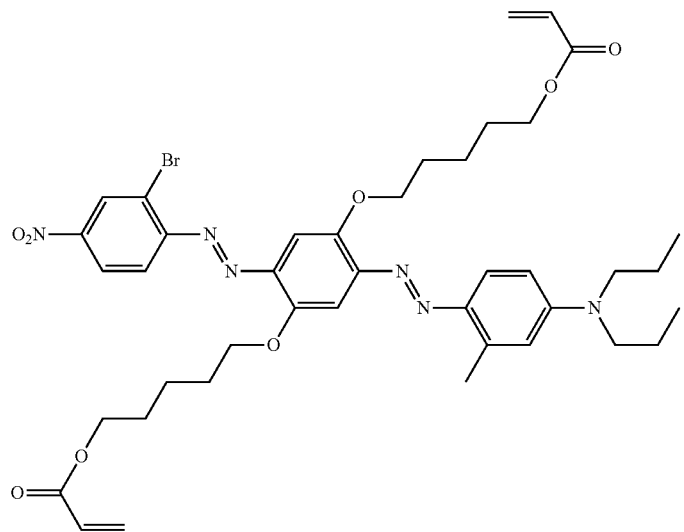
Dye 15
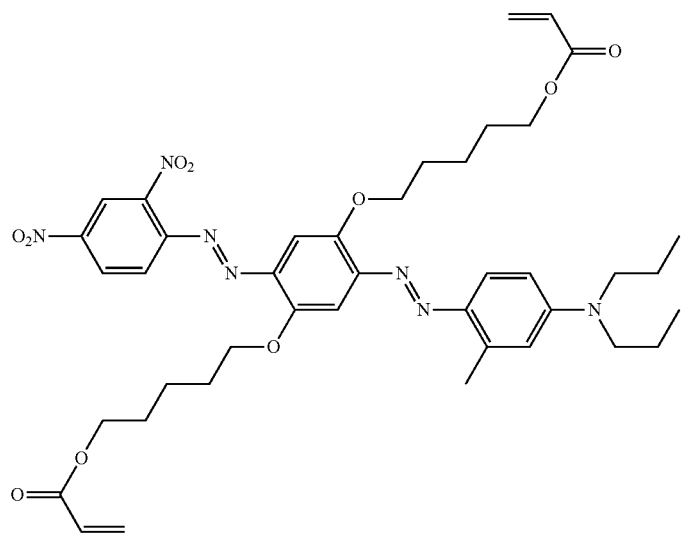 [SMILES: C=CC(=O)OCCCCCOc1cc(/N=N/c2ccc([N+](=O)[O-])cc2[N+](=O)[O-])c(OCCCCCOC(=O)C=C)cc1/N=N/c1ccc(N(CCC)CCC)cc1C]
Dye 16
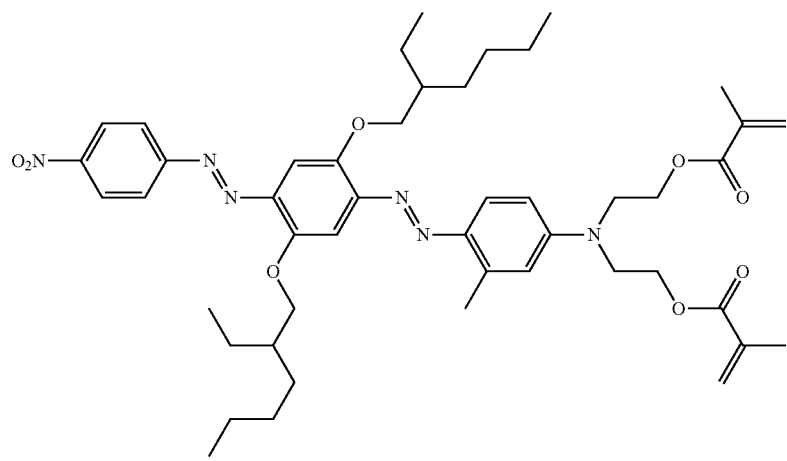 [SMILES: C=C(C)C(=O)OCCN(CCOC(=O)C(=C)C)c1ccc(/N=N/c2cc(OCC(CC)CCCC)c(/N=N/c3ccc([N+](=O)[O-])cc3)cc2OCC(CC)CCCC)c(C)c1]

TABLE 2-continued
Dye 17
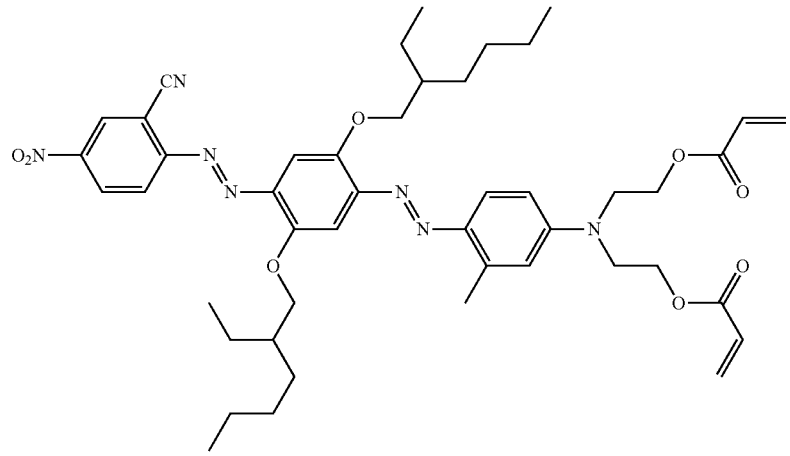 [SMILES: C=CC(=O)OCCN(CCOC(=O)C=C)c1ccc(/N=N/c2cc(OCC(CC)CCCC)c(/N=N/c3ccc([N+](=O)[O-])cc3C#N)cc2OCC(CC)CCCC)c(C)c1]
Dye 18
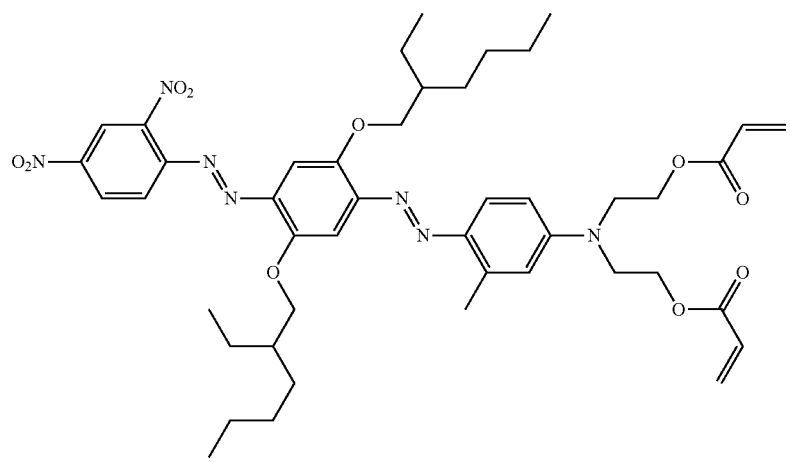 [SMILES: C=CC(=O)OCCN(CCOC(=O)C=C)c1ccc(/N=N/c2cc(OCC(CC)CCCC)c(/N=N/c3ccc([N+](=O)[O-])cc3[N+](=O)[O-])cc2OCC(CC)CCCC)c(C)c1]
Dye 19
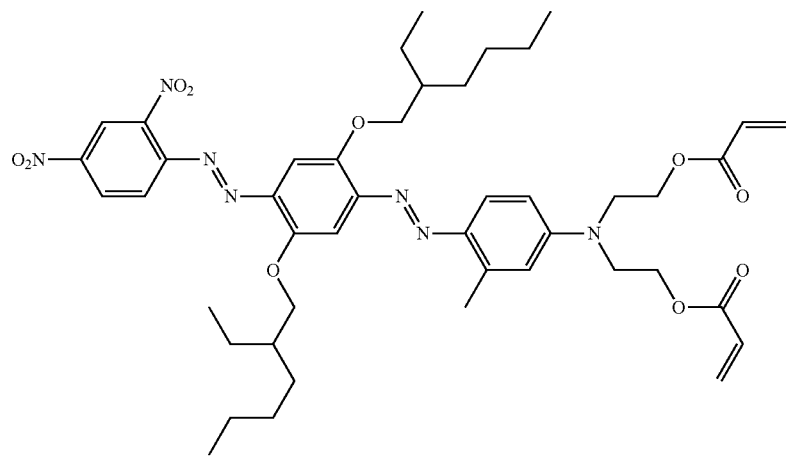 [SMILES: C=CC(=O)OCCN(CCOC(=O)C=C)c1ccc(/N=N/c2cc(OCC(CC)CCCC)c(/N=N/c3ccc([N+](=O)[O-])cc3[N+](=O)[O-])cc2OCC(CC)CCCC)c(C)c1]

TABLE 2-continued
Dye 20
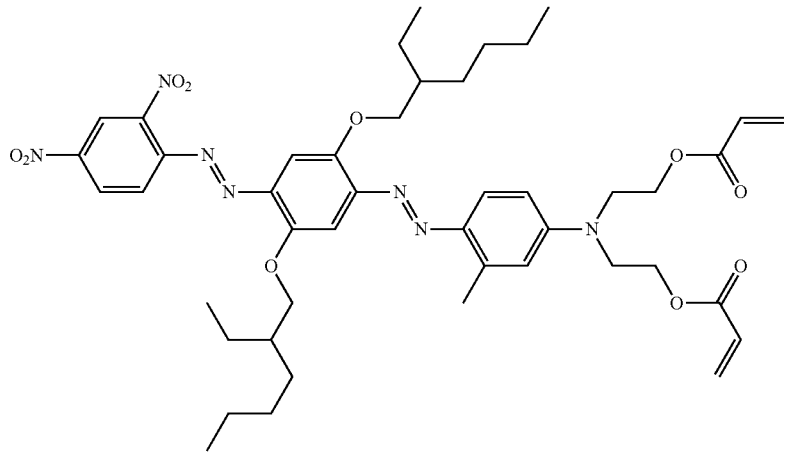 [SMILES: C=CC(=O)OCCN(CCOC(=O)C=C)c1ccc(/N=N/c2cc(OCC(CC)CCCC)c(/N=N/c3ccc([N+](=O)[O-])cc3[N+](=O)[O-])cc2OCC(CC)CCCC)c(C)c1]
Dye 21
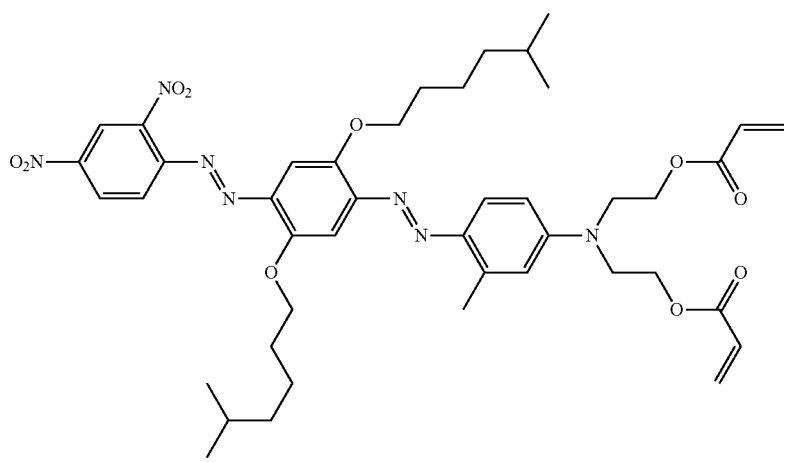 [SMILES: C=CC(=O)OCCN(CCOC(=O)C=C)c1ccc(/N=N/c2cc(OCCCCC(C)C)c(/N=N/c3ccc([N+](=O)[O-])cc3[N+](=O)[O-])cc2OCCCCC(C)C)c(C)c1]
Dye 22
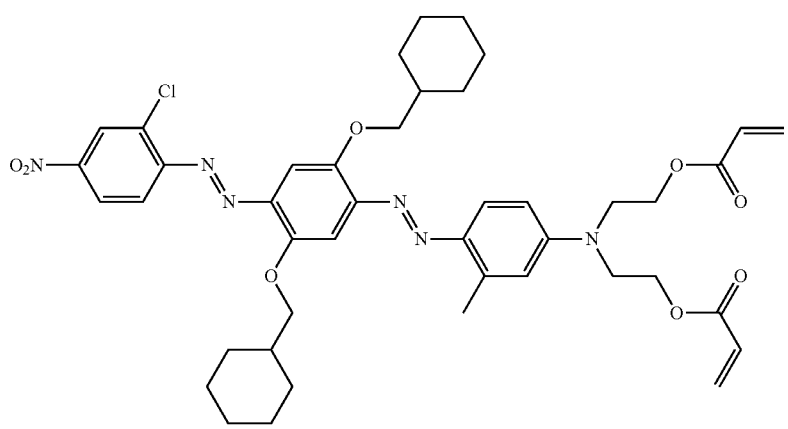 [SMILES: C=CC(=O)OCCN(CCOC(=O)C=C)c1ccc(/N=N/c2cc(OCC3CCCCC3)c(/N=N/c3ccc([N+](=O)[O-])cc3Cl)cc2OCC2CCCCC2)c(C)c1]

TABLE 2-continued
Dye 23
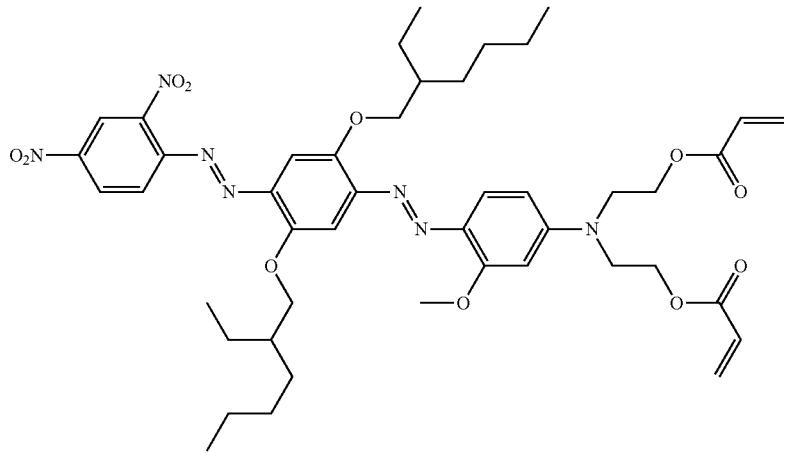 [SMILES: C=CC(=O)OCCN(CCOC(=O)C=C)c1ccc(/N=N/c2cc(OCC(CC)CCCC)c(/N=N/c3ccc([N+](=O)[O-])cc3[N+](=O)[O-])cc2OCC(CC)CCCC)c(OC)c1]
Dye 24
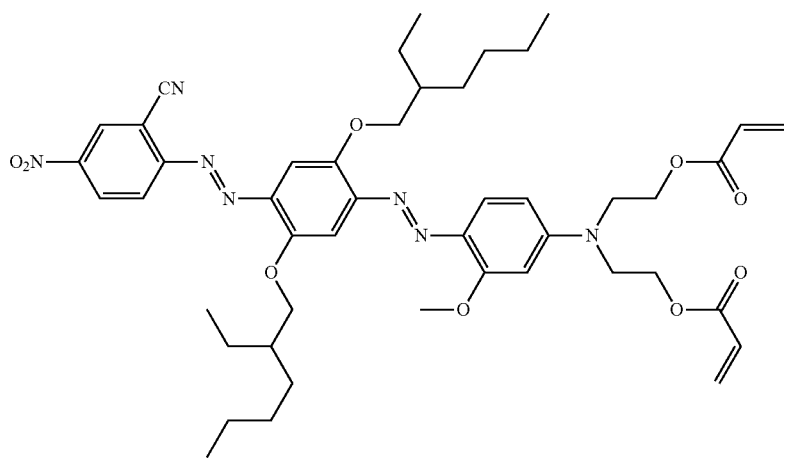 [SMILES: C=CC(=O)OCCN(CCOC(=O)C=C)c1ccc(/N=N/c2cc(OCC(CC)CCCC)c(/N=N/c3ccc([N+](=O)[O-])cc3C#N)cc2OCC(CC)CCCC)c(OC)c1]
Dye 25
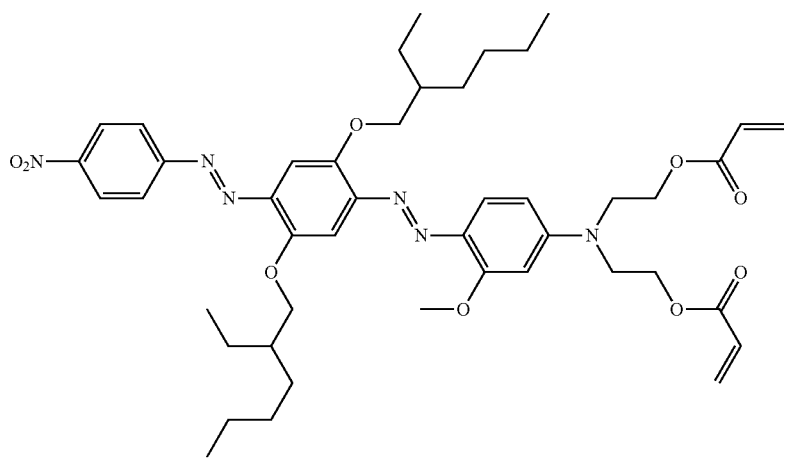 [SMILES: C=CC(=O)OCCN(CCOC(=O)C=C)c1ccc(/N=N/c2cc(OCC(CC)CCCC)c(/N=N/c3ccc([N+](=O)[O-])cc3)cc2OCC(CC)CCCC)c(OC)c1]

| | |
|---|---|
| Dye 26 | 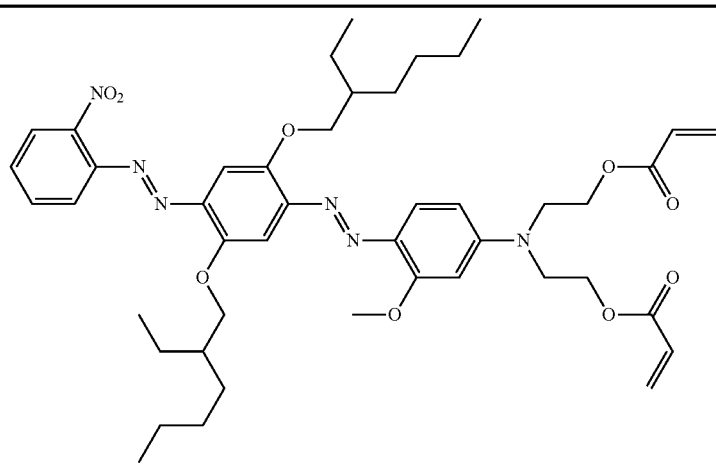 |
The following schemes show by way of example for Dyes 1, 2, and 3 the synthesis of polymerisable dyes of the invention, especially for dyes of Formulas (2) to (5), which can be carried out by processes and under conditions known to the person skilled in the art:

Scheme 1: Dyes of Formulas (2) and (3):
The preparation of polymerisable dyes of Formulas (2) and (3) by a 4 step procedure under convenient conditions as known in the art is exemplified in the following scheme for 2,2'-(2-((4-(dioctylamino)-2-methylphenyl)diazenyl)-5-((4-nitrophenyl)diazenyl)-1,4-phenylene)bis(oxy)bis(ethane-2,1-diyl) diacrylate (Dye 1):
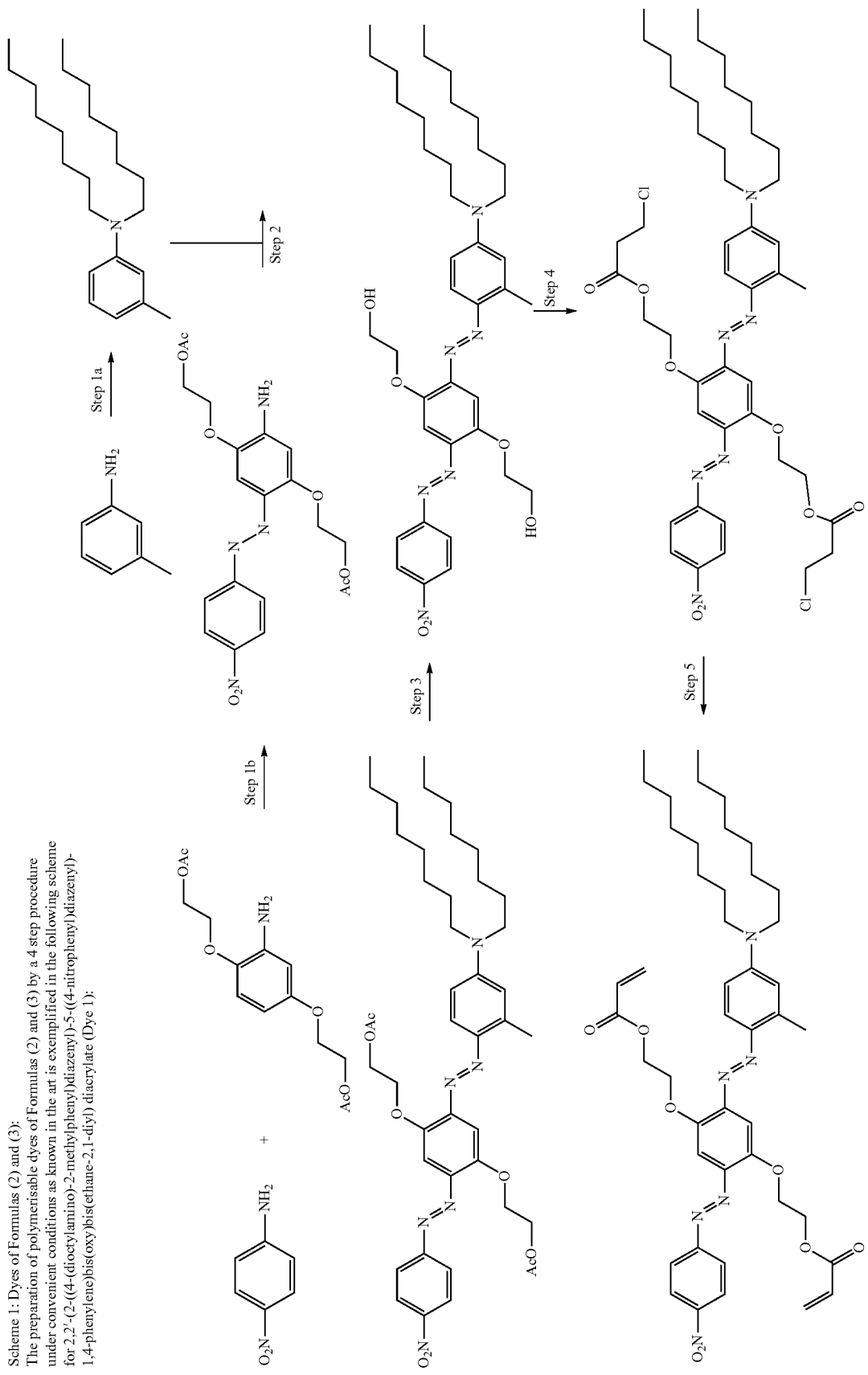

Scheme 2: Dyes of Formula (4):
The preparation of polymerisable dyes of Formula (4) by a 4 step procedure under convenient conditions as known in the art is exemplified in the following scheme for 2,2'-((2-((4-(Dioctylamino)-2-methylphenyl)diazenyl)-5-((4-nitrophenyl)diazenyl)-1,4-phenylene)bis(oxy)bis(ethane-2,1-diyl))diacrylate (Dye 2):
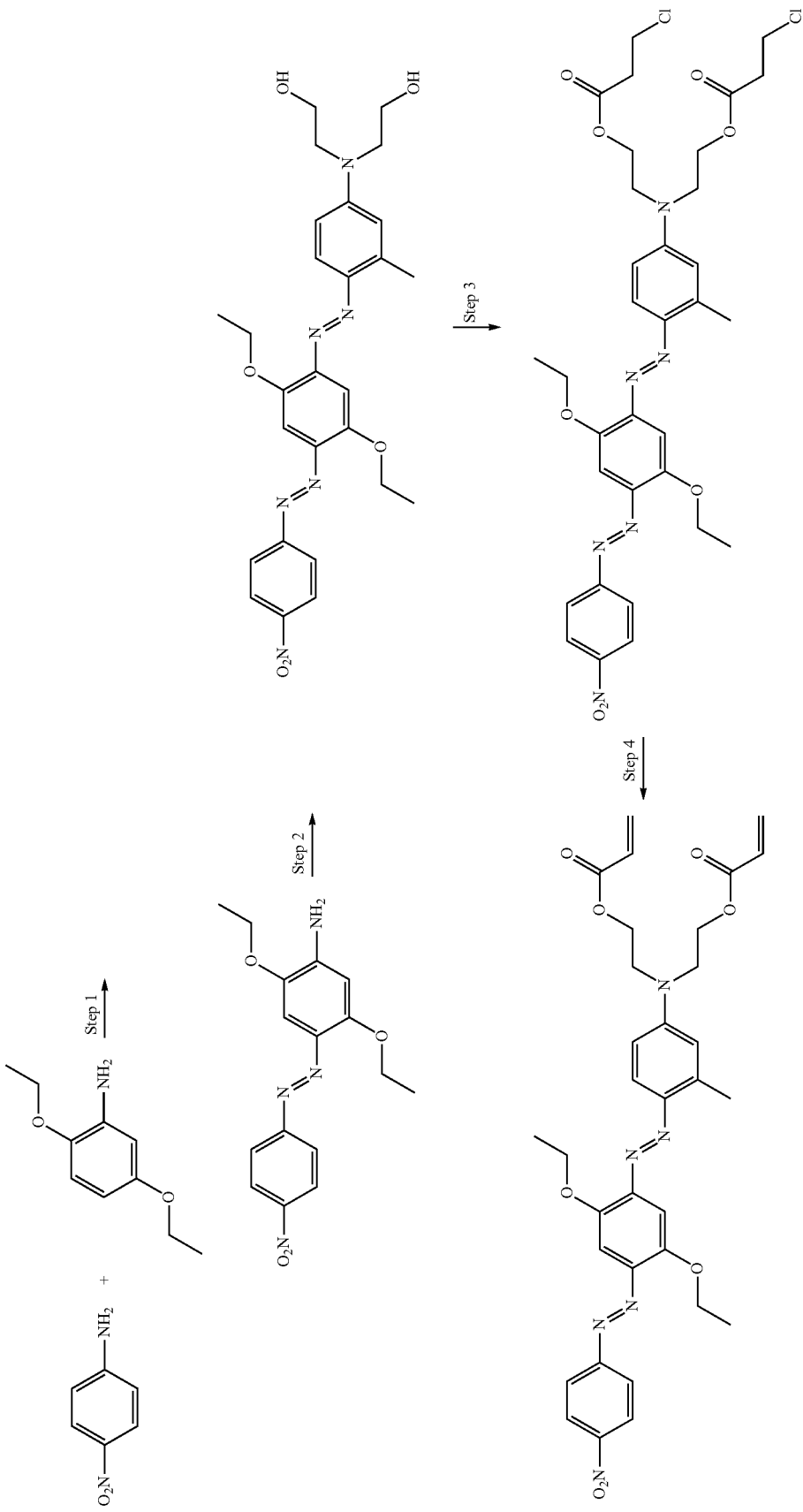

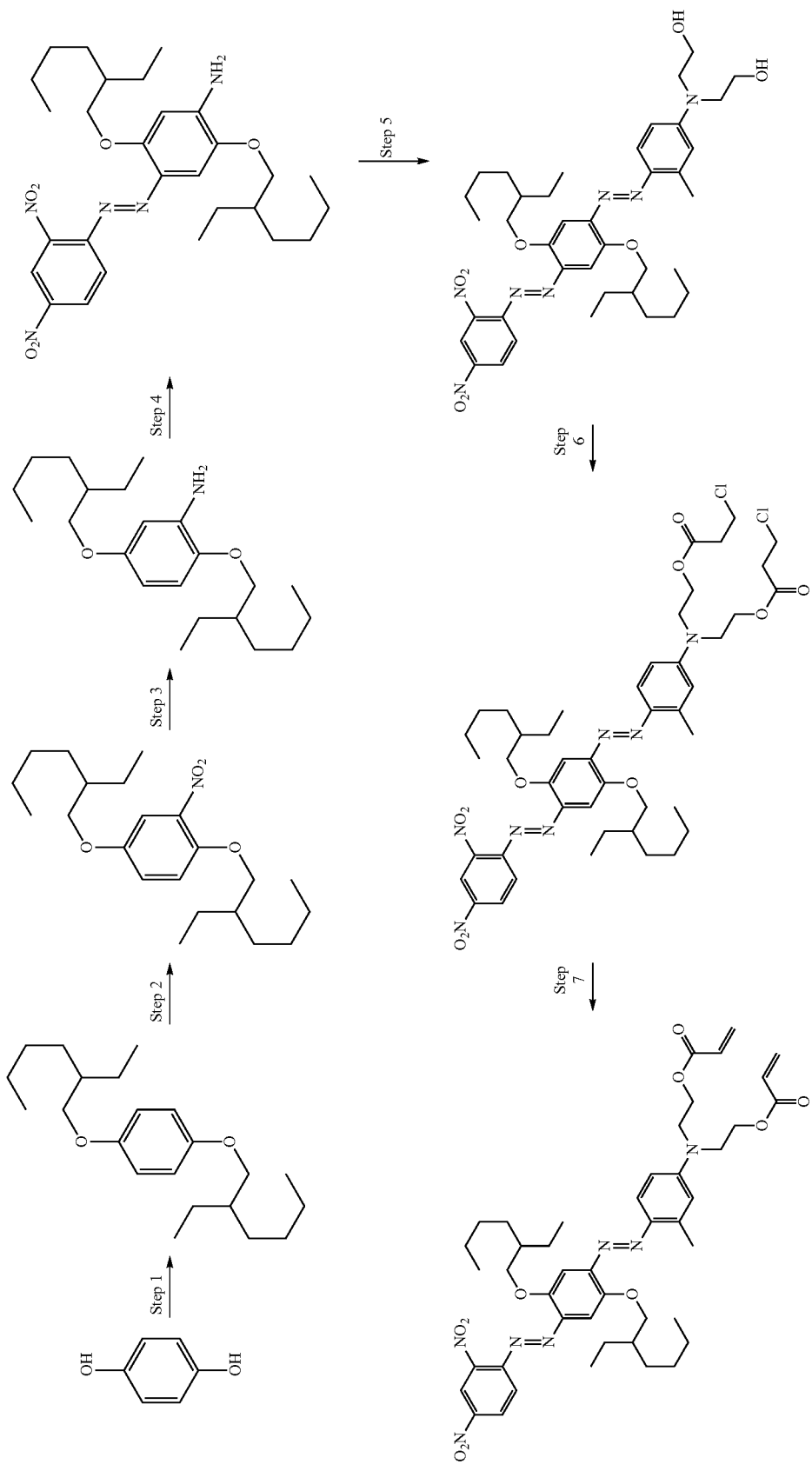
Scheme 3: Dyes of Formula (5):
The preparation of polymerisable dyes of Formula (5) by a 7 step procedure under convenient conditions as known in the art is exemplified in the following scheme for (Dye 3):

The preparation of further polymerisable dyes can be carried out analogously to the illustrative reactions shown above Especially, combinations of different preferred coloured particles and combinations of the preferred coloured particles with the preferred black or white particles may be used.

Polymer particles suitable for the invention are preferably spherical particles with a size (diameter) in the range of 50-1200 nm, preferably 50-1000 nm and preferably with a monodisperse size distribution. Preferred particle sizes are 150-950 nm. In a variant of the invention preferred particle sizes are 500-950 nm. Particle sizes are determined by photon correlation spectroscopy of hydrocarbon particle dispersions by a common apparatus such as a Malvern NanoZS particle analyser or preferably by SEM (Scanning Electron Microscopy) and image analysis.

The present electrophoretic fluids comprising particles having the same charge sign and similar electrophoretic mobilities show to the observer a single colour. Particle mixtures according to the invention can be used as single or dual particle EPD fluids in a conventional manner. The particle dispersion will typically contain particles, surfactants to aid charging and stability, and solvent. The particles should have a similar surface structure, and charge in the presence of surfactants in the same way. Where a dual particle effect is required, a second type of particle will also be incorporated, either singly, or as a mixture of different colours, to provide a counter particle. A second surfactant may be used to charge the counter particle, and/or the surface functionality may differ to that of the first particle.

Electrophoretic fluids of the invention are primarily designed for use in electrophoretic display devices. So, further subjects of the invention are electrophoretic display devices comprising such fluids.

A typical electrophoretic display device which preferably consists of the particles dispersed in a low polar or non-polar solvent along with additives to improve electrophoretic properties, such as stability and charge. Examples of such electrophoretic dispersions are well described in the literature, for example U.S. Pat. No. 7,247,379; WO 99/10767; US 2007/0128352; U.S. Pat. No. 7,236,290; U.S. Pat. No. 7,170,670; U.S. Pat. No. 7,038,655; U.S. Pat. No. 7,277,218; U.S. Pat. No. 7,226,550; U.S. Pat. No. 7,110,162; U.S. Pat. No. 6,956,690; U.S. Pat. No. 7,052,766; U.S. Pat. No. 6,194,488; U.S. Pat. No. 5,783,614; U.S. Pat. No. 5,403,518; U.S. Pat. No. 5,380,362.

The role of the surfactant is to stabilize the dispersion and provide charge to the particles, allowing them to switch electrophoretically. This may be achieved by using a blend of surfactants or one single surfactant. Surfactant examples are generally those with a hydrophilic head group and a hydrophobic tail.

Typical surfactants (either by steric stabilisation or by use as a charging agent) are known to experts in the field and include (but are not limited to) the Brij, Span and Tween series of surfactants (Aldrich), the Solsperse, Ircosperse and Colorburst series (Lubrizol), the OLOA charging agents (Chevron Chemicals) and Aerosol-OT (A-OT) (Aldrich). Preferable surfactant additives in this work are OLOA, A-OT and derivatives, Span surfactants, and even more preferably A-OT and Span 85.

Any other additives to improve the electrophoretic properties can be incorporated provided they are soluble in the formulation medium, in particular thickening agents or polymer additives designed to minimise settling effects.

The dispersion solvent can be chosen primarily on the basis of dielectric constant, refractive index, density and viscosity. A preferred solvent choice would display a low dielectric constant (<10, more preferably <5), high volume resistivity (about $10^{15}$ ohm-cm), a low viscosity (less than 5 cst), low water solubility, a high boiling point (>80° C.) and a refractive index and density similar to that of the particles. Tweaking these variables can be useful in order to change the behavior of the final application. For example, in a slow-switching application such as poster displays or shelf labels, it can be advantageous to have an increased viscosity to improve the lifetime of the image, at the cost of slower switching speeds. However in an application requiring fast switching, for example e-books and displays, a lower viscosity will enable faster switching, at the cost of the lifetime in which the image remains stable (and hence an increase in power consumption as the display will need more frequent addressing). The preferred solvents are often non-polar hydrocarbon solvents such as the Isopar series (Exxon-Mobil), Norpar, Shell-Sol (Shell), Sol-Trol (Shell), naphtha, and other petroleum solvents, as well as long chain alkanes such as dodecane, tetradecane, hexadecane, decane and nonane, and also dimethyltetralin. These tend to be low dielectric, low viscosity, and low density solvents. A density matched particle/solvent mixture will yield much improved settling/sedimentation characteristics and thus is desirable. For this reason, often it can be useful to add a halogenated solvent to enable density matching. Typical examples of such solvents are the Halocarbon oil series (Halocarbon products), or tetrachlorethylene, carbon tetrachloride, 1,2,4-trichlorobenzene and similar solvents. The negative aspect of many of these solvents is toxicity and environmental friendliness, and so in some cases it can also be beneficial to add additives to enhance stability to sedimentation rather than using such solvents.

The preferred additives and solvents used in the formulation of the particles of the invention are OLOA11000 (Chevron Chemicals), Ircosperse 2153 (Lubrizol Ltd), and dodecane (Sigma Aldrich)

The solvents and additives used to disperse the polymer particles of the invention are not limited to those used within the examples of this invention and many other solvents and/or dispersants can be used. Lists of suitable solvents and dispersants for electrophoretic displays can be found in existing literature, in particular WO 99/10767 and WO 2005/017046. Especially, combinations of preferred coloured particles and combinations of the preferred coloured particles with the preferred black and/or preferred white particles in combination with the preferred solvents and additives may be used.

The electrophoretic fluid is then incorporated into an electrophoretic display element by a variety of pixel architectures, such as can be found in C. M. Lampert, Displays; 2004, 25(5) published by Elsevier B. V., Amsterdam. The electrophoretic fluid may be applied by several techniques such as inkjet printing, slot die spraying, nozzle spraying, and flexographic printing, or any other contact or contactless printing or deposition technique. Electrophoretic displays comprise typically, the electrophoretic display media in close combination with a monolithic or patterned backplane electrode structure, suitable for switching the pixels or patterned elements between the black and white optical states or their intermediate greyscale states.

The electrophoretic fluids according to the present invention are suitable for all known electrophoretic media and electrophoretic displays, e.g. flexible displays, one particle systems, two particle systems, dyed fluids, systems comprising microcapsules, microcup systems, air gap systems and others as described in C. M. Lampert, Displays; 2004, 25(5) published by Elsevier B. V., Amsterdam. Examples of flexible displays are dynamic keypads, e-paper watches, dynamic pricing and advertising, e-readers, rollable displays, smart card media, product packaging, mobile phones, lab tops, display card, digital signage.

The disclosures of the cited references are expressly also part of the disclosure content of the present patent application. In the claims and the description, the words "comprise/comprises/comprising" and "contain/contains/containing" mean that the listed components are included but that other components are not excluded. All process steps described above and below can be carried out using known techniques and standard equipments which are described in prior art and are well-known to the skilled person. The following examples explain the present invention in greater detail without restricting the scope of protection.

EXAMPLES

The characterisation of the formulations is performed using a Malvern NanoZS particle analyser unless otherwise stated. This instrument measures the size of particles in dispersion and the zeta potential of an electrophoretic fluid. The Zeta potential (ZP) is derived from the real-time measurement of the electrophoretic mobility and thus is an indicator of the suitability of the fluid for use in electrophoretic applications.

Colour measurements are performed using an Xrite Colori5 spectrophotometer, in reflection mode with a standard ceramic white background, d65 illumination, and with specular reflections excluded. The sample is measured in a custom made glass cell with 50 micron cell gap and ITO layer.

All solvents are purchased from VWR at the highest grade possible and are used without further purification. Surfactants are purchased from Sigma Aldrich and are used without further purification. Colour particles in all examples are synthesised as exemplified in WO 2012/019704. White particles are synthesised as exemplified in WO 2011/154104. In addition, reflective colour particles can be used, as in Example 13, and are synthesised as exemplified in the earlier patent application PCT/EP2012/003226.

The following abbreviations are used:
IMS industrial methylated spirit;
NMP N-Methylpyrrolidone
THF Tetrahydrofuran
Mp melting point Example 1

Preparation of Black Particles 1-a: Black Dye

Prepared by a 7 Step Procedure as Detailed Below

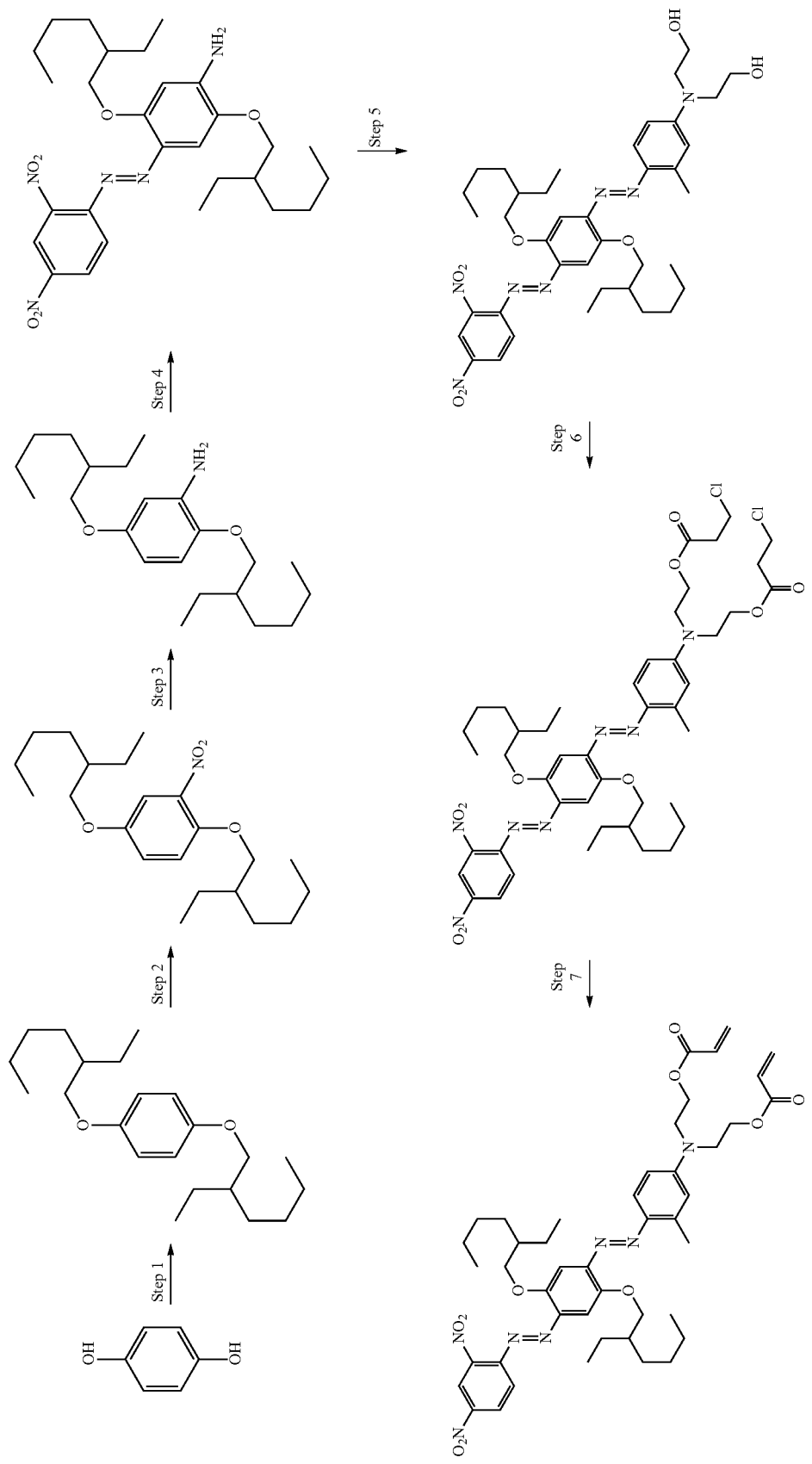

Step 1: 1,4-Bis(2-ethylhexyloxy)benzene

Hydroquinone (37.9 g, 0.344 mol) is suspended in IMS (310 ml) and 1-bromo-2-ethylhexane (132.7 g, 0.687 mol) is added. A solution of KOH (49.9 g, 0.89 mol) in IMS (250 ml) is added slowly over 1 minute. The mixture is heated at reflux whilst monitoring reaction progress by HPLC. After 16 hours, further 1-bromo-2-ethylhexane (53.1 g, 0.27 mol) and solid KOH (20.0 g, 0.36 mol) are added then heated for 2 hours at reflux. The reaction mixture is allowed to cool, is poured into water (1.5 L) and extracted with toluene (500 ml). The organic layer is dried over $MgSO_4$ then evaporated to yield a pale yellow oil. The oil is flashed through silica gel, eluting with 50/50 dichloromethane/hexane to give two product fractions. The initial fraction (35.3 g) co-eluted with 2-ethylhexan-1-ol by-product. The second fraction is evaporated to give pure 1,4-bis(2-ethylhexyloxy)benzene as a pale yellow oil (48.4 g, 42%). The initial fraction is further purified by bulb to bulb distillation to give further pure 1,4-bis(2-ethylhexyloxy)benzene as a pale yellow oil (25.3 g, 22%).

Step 2: 1,4-Bis(2-ethylhexyloxy)-2-nitrobenzene 1,4-Bis(2-ethylhexyloxy)benzene (50.2 g, 0.150 mol) is dissolved in chloroform (150 ml) and cooled to 0° C. Nitric acid (70%, 17.0 g, 0.190 mol) is added dropwise at 0-3° C. and the reaction stirred whilst monitoring progress by HPLC. After 60 minutes, water (50 ml) is added and the organic layer separated, dried ($MgSO_4$) and evaporated to give the title compound as a yellow oil (56.9 g, 100%). The material is used without further purification.

Step 3: 2,5-Bis(2-ethylhexyloxy)aniline 1,4-Bis(2-ethylhexyloxy)-2-nitrobenzene (11.4 g, 0.03 mol) is dissolved in 2-propanol (100 ml) and degassed under vacuum, purging to nitrogen. 10% (w/w) Pd/C (0.52 g) is added and the mixture heated to 80° C. Water (10 ml) is added, followed by solid ammonium formate (18.9 g, 0.3 mol). After a further 1 hour at 80° C., the reaction mixture is allowed to cool then filtered to remove catalyst, to give a colourless solution which darkened rapidly on standing. The material is used immediately as an isopropanol solution (quant.).

Step 4: 4-((2,4-Dinitrophenyl)diazenyl)-2,5-bis(2-ethylhexyloxy)aniline 2,4-Dinitroaniline (3.7 g, 0.02 mol) is suspended in a mixture of acetic acid (20 ml) and propionic acid (10 ml) and cooled to 3° C. 40% (w/w) nitrosyl sulfuric acid in sulfuric acid (6.4 g, 0.02 mol) is added dropwise and stirring continued for 30 minutes to give a pale yellow solution. Crude 2,5-bis(2-ethylhexyloxy)aniline (0.02 mol) solution is diluted with IMS (200 ml) and 10% sulfamic acid solution (20 ml) added, followed by ice (200 g). The above pale yellow diazonium salt solution is slowly added with stirring and a dark oil rapidly separated. The mixture is stirred overnight and the water is decanted off. The crude product (8.3 g) is dissolved in 25/75 dichloromethane/hexane and purified over silica gel, the required product eluting with 50/50 hexane/dichloromethane. Evaporation and trituration with methanol gave 4-((2,4-dinitrophenyl)diazenyl)-2,5-bis(2-ethylhexyloxy)-aniline as a violet-blue crystalline solid (4.2 g, 39%).

Step 5: 2,2'-(4-((E)-(4-((E)-(2,4-Dinitrophenyl)diazenyl)-2,5-bis(2-ethylhexyloxy)phenyl)diazenyl)-3-methylphenylazanediyl)diethanol 4-((2,4-Dinitrophenyl)diazenyl)-2,5-bis(2-ethylhexyloxy) aniline (0.54 g, 1 mmol) is dissolved in NMP (10 ml) and to this is added 40% (w/w) nitrosyl sulfuric acid in sulfuric acid (0.38 g, 1.2 mmol). After 30 minutes, the mixture is added to a solution of 2,2'-(m-tolylazanediyl)diethanol (0.20 g, 1 mmol) and sulfamic acid (0.5 g) in IMS (100 ml). A dark oily solid separates immediately. After stirring overnight, the aqueous supernatant is decanted off, the oily solid washed with further water, then dried at 40° C. The pure title compound is acquired as a blue-black solid after multiple purifications over silica gel, eluting with dichloromethane containing an increasing concentration of ethyl acetate (0.54 g, 72%).

Step 6: 2,2'-(4-((E)-(4-((E)-(2,4-dinitrophenyl)diazenyl)-2,5-bis(2-ethylhexyloxy)phenyl)diazenyl)-3-methylphenylazanediyl)bis(ethane-2,1-diyl)bis(3-chloropropanoate)

2,2'-(4-((E)-(4-((E)-(2,4-Dinitrophenyl)diazenyl)-2,5-bis (2-ethylhexyloxy)phenyl)diazenyl)-3-methylphenylazanediyl)diethanol (3.5 g, 5 mmol) is dissolved in dichloromethane (50 ml) and sodium bicarbonate (12.6 g, 0.15 mol) is added with stirring to suspend. 3-Chloropropionyl chloride (1.9 g, 15 mmol) is added and the mixture heated at 40° C. (bath temp.) overnight. The inorganics are filtered off, the dichloromethane is evaporated and the product solidified by adding IMS. A 2.7 g sample of crude product is taken through directly to the next step without further purification. A 1 g sample of material is recrystallised from IMS to obtain a pure sample as a violet/black crystalline solid; m.p 123-125° C., $\lambda_{max}$ (EtOAc) 573 nm (40,000), half bandwidth 160 nm, 353 nm (13,500).

Step 7: 2,2'-(4-((E)-(4-((E)-(2,4-dinitrophenyl)diazenyl)-2,5-bis(2-ethylhexyloxy)phenyl)diazenyl)-3-methylphenylazanediyl)bis(ethane-2,1-diyl)diacrylate Crude 2,2'-(4-((E)-(4-((E)-(2,4-dinitrophenyl)diazenyl)-2, 5-bis(2-ethylhexyloxy)phenyl)diazenyl)-3-methylphenylazanediyl)bis(ethane-2,1-diyl)bis(3-chloropropanoate) (2.7 g, 2.9 mmol) is dissolved in dichloromethane (50 ml) and triethylamine (0.9 g, 8.7 mmol) is added. The mixture is heated at 30° C. (bath temp.) overnight and the product precipitated by adding IMS. The solid is recrystallised from hot IMS and the title compound is isolated as a violet/black powder; m.p 128-130° C., $\lambda_{max}$ (EtOAc) 574 nm (40,000), half bandwidth 160 nm, 354 nm (13,500).

1-b: Black Particles

NAD stabiliser 30% by weight in dodecane is obtained from ICI Ltd. precipitated in cold methanol, dried and dissolved in a 50:50 mixture of ethyl acetate (Aldrich) and butyl acetate (Aldrich). All materials other than dye are commercially available.

Methyl methacrylate (20.58 g), NAD stabiliser (3.50 g) and methacrylic acid (0.42 ml) are weighed out into a 100 ml 3-necked flask equipped with a condenser, nitrogen flow, and an overhead stirrer. Black Dye of Example 1-a (1.029 g, 5 weight %) is added and stirred for 1 minute to facilitate dissolution of the dye. Dodecane (25.20 g) is added to the reaction flask, followed by 1-octanethiol (0.125 ml). The mixture is heated with stirring at 300 rpm, once the temperature in the flask is at 75° C., Vazo 67 (0.20 g) is added and the reaction is stirred for 2 hours.

The resulting solution is filtered through 50 micron cloth to remove small lumps. The particles are cleaned using a centrifuge. Centrifugations are carried out at 10 000 rpm for 40 minutes each, replacing the supernatant with dodecane, this is repeated until the supernatant is colourless. Average particle size was measured by SEM and image analysis: 234 nm.

Example 2

Preparation of White Particles

An aqueous phase is formed by combining water (17.6 g), TiPure R900 (1 g) and poly(acrylamide) (4.8 g). This dispersion is stirred until homogeneous and is then submitted to high shear homogenisation by a Branson Sonifer 450 using a horn probe at 40% strength for 5 minutes.

In a separate flask, an oil phase is formed by combining Solsperse 17000 (2.4 g) and dodecane (80 g). This solution is stirred until homogeneous. An IKA high shear homogeniser is submerged in the oil phase and stirring is started at 20,000 rpm.

The aqueous phase is then added dropwise to the oil phase over 1 minute, and stirring is maintained for 4 further minutes. The reverse pre-emulsion is then submitted to high shear homogenisation by a Branson Sonifier 450 using a horn probe at 40% strength for 5 minutes to form the final reverse emulsion. The reverse emulsion is then transferred to a Florentine flask and placed on a rotary evaporator to remove water from the discontinuous phase of the reverse emulsion.

On completion, the product is obtained as a suspension of white reflective particles of TiPure R900 in a matrix of poly(acrylamide), stabilised by Solsperse 17,000 and dispersed in dodecane.

Example 3

Preparation of Coloured Particles 3-a: Cyan Particles

Cyan particles are prepared according the process described in Example 1-b by using 5 weight-% of the copper phthalocyanine prepared by the following 3 step procedure as described in detail in Example 4 of WO 2012/019704:

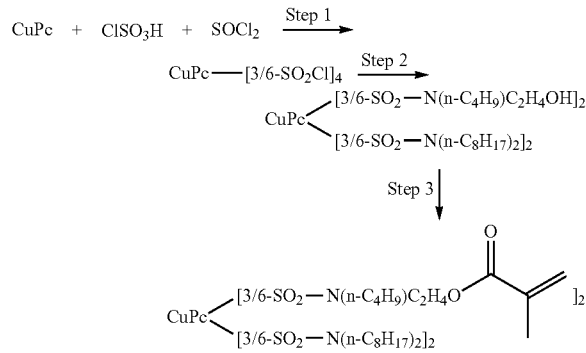

3-b: Magenta(1) Particles

Magenta(1) particles are prepared according the process described in Example 1-b by using 5 weight-% of acrylic acid 2-[[3-butyrylylamino-4-(4-cyano-3-methylisothiazol-5-ylazo)-phenyl]-(2-acryloyloxyethyl)-amino]-ethyl ester prepared by the following 3 step procedure as described in detail in Example 11 of WO 2012/019704:

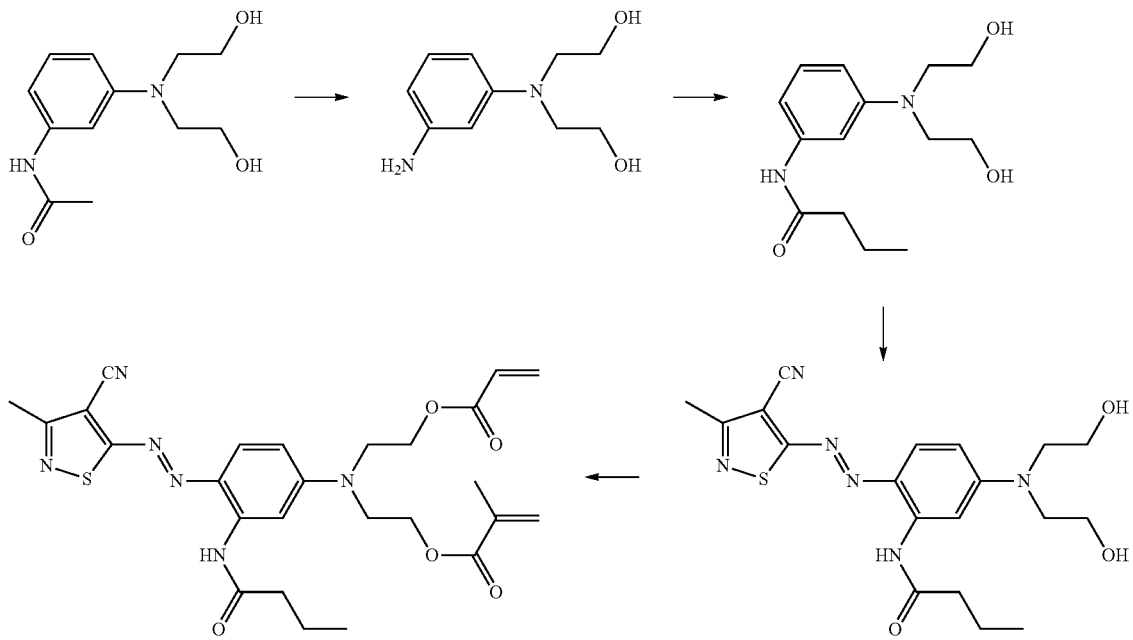

3-b': Magenta(2) Particles

Magenta(2) particles are prepared according the process described in Example 1b by using 5 weight-% of 2-methacrylic acid 2-{[4-(3,5-dicyano-4-methylthien-2-ylazo)-phenyl]-[2-(2-methacryloyloxy)-ethyl]-amino}ethyl ester prepared by the following 3 step procedure as described in detail in Example 5 of WO 2012/019704:

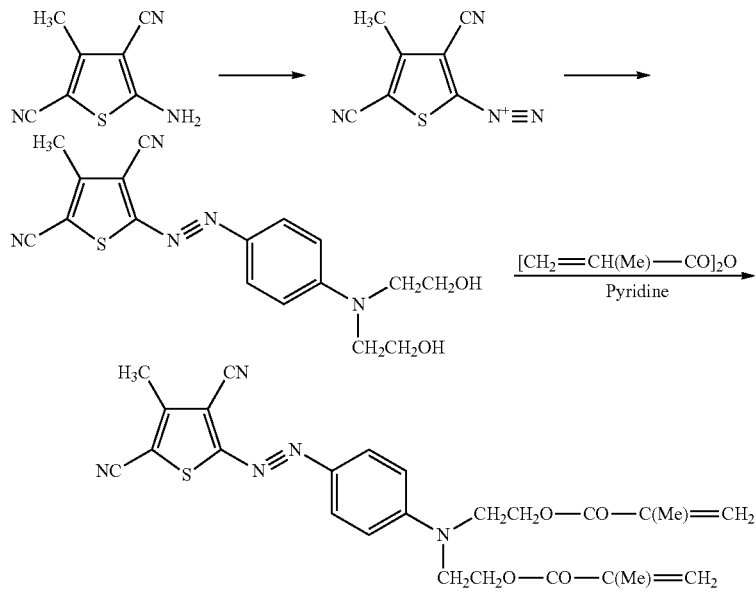

3-c: Yellow Particles

Yellow particles are prepared according the process described in Example 1-b by using 5 weight-% of 2,2-(4-((5-cyano-1-(2-ethylhexyl)-2-hydroxy-4-methyl-6-oxo-1,6-dihydropyridin-3-yl)diazenyl)phenylsulfonylazanediyl)-bis(ethane-2,1-diyl)diacrylate prepared by the following 1 step procedure as described in detail in Example 24 of WO 2012/019704:

3-d: Red Particles

Red particles are prepared according the process described in Example 1-b by using 5 weight-% of 2,2'-(4-((4-cyano-3-methylisothiazol-5-yl)diazenyl)-phenylazanediyl)bis(ethane-2,1-diyl)bis(2-methylacrylate) prepared by the following 2 step procedure as described in detail in Example 18 of WO 2012/019704:

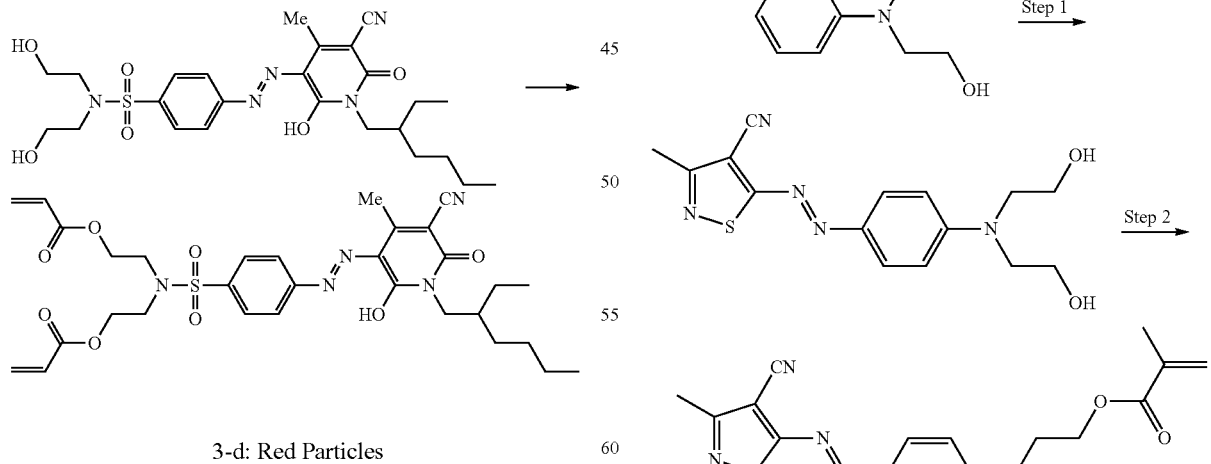

3-e: Green Particles

Green particles are prepared according the process described in Example 1-b by using 5 weight-% of a 2:1 mixture of the copper phthalocyanine prepared by the following 3 step procedure as described in detail in example 1 of WO 2012/019704 and of 2-methacrylic acid 2-{[4-(1-butyl-5-cyano-2-hydroxy-4-methyl-6-oxo-1,6-dihydro-pyridin-3-ylazo)-benzenesulphonyl]-[2-(2-methacryloyloxy)-ethyl]-amino} ethyl ester prepared by the following 4 step procedure as described in detail in Example 21 of WO 2012/019704:

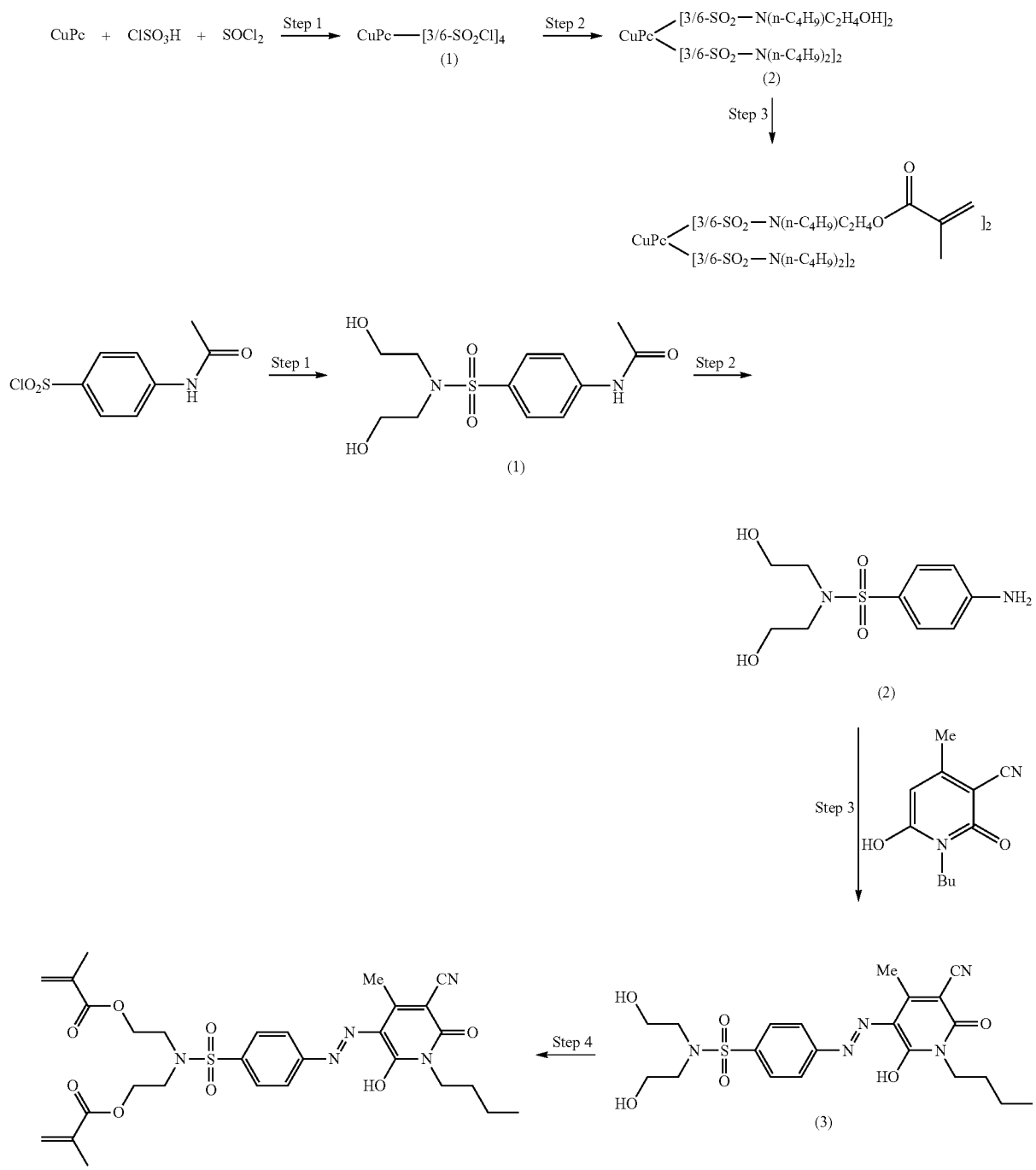

3-f: Blue Particles

Blue particles are prepared according the process described in Example 1-b by using 5 weight-% 2,2'-(3-acetamido-4-((2,6-dicyano-4-nitrophenyl)-diazenyl)phenylazanediyl)bis(ethane-2,1-diyl)bis(2-methylacrylate) prepared by the following 3 step procedure as described in detail in Example 25 of WO 2012/019704:

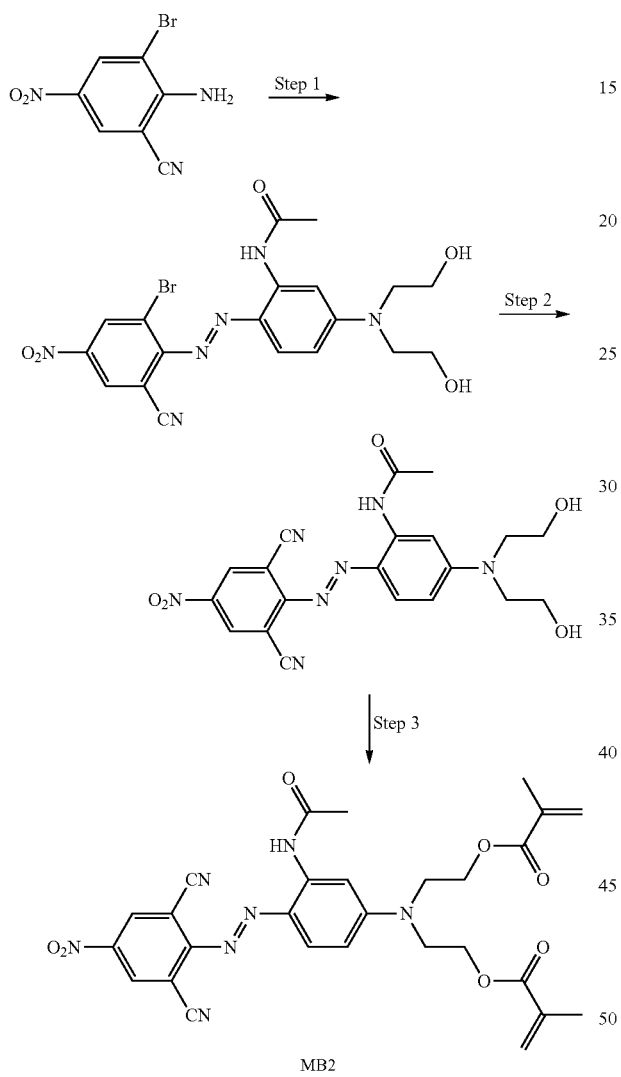

3-g: Green Particles

According to Example 5 of the earlier filed patent application PCT/EP2012/003226, an aqueous phase is formed by combining water (17.6 g), Green Chromium Oxide (12.0 g) and poly(acrylamide) (9.6 g, 50 wt % in water). This dispersion is stirred until homogeneous and is then submitted to homogenisation by a Branson Sonifier 450 using a horn probe at 40% strength for 5 minutes.

In a separate 3-neck flask an oil phase is formed by combining Solsperse 17000 (2.4 g) and dodecane (60 g). This solution is stirred until homogeneous. An IKA homogeniser is inserted and used at 10000 rpm for approximately 1 minute.

The aqueous phase is then added dropwise to the oil phase over 2 minutes, and high shear stirring is maintained for 3 further minutes. The pre-emulsion is then submitted to homogenisation by a Branson Sonifier 450 using a horn probe at 40% strength for 5 minutes to form the final emulsion. Distillation equipment is attached to the flask. Stirring is started and the emulsion is warmed to 50° C. for 1 hour and maintained at 100 mbar. The water is removed by reducing the pressure to 40 mbar, in steps of 10 mbar every 20 minutes. Once 40 mbar pressure has been reached, the solution is held under this pressure and temperature for 2 hours after which time room temperature and atmospheric pressure are resumed. On completion, the product is obtained as a suspension of green reflective particles of Green chrome oxide pigment in a matrix of poly(acrylamide), stabilised by Solsperse 17,000 and dispersed in dodecane.

Electrophoretic Fluids

Example 4

Preparation of a Black "Single Particle-Type" Electrophoretic Fluid Using 2 Particles (Tuning of Black Using Yellow Particles)

0.2 g of black dyed particles of Example 1 are dispersed in 2 g of dodecane in the presence of 0.01 g AOT (Dispersion 1). 0.2 g of yellow dyed particles of Example 3-c are dispersed in 2 g of dodecane in the presence of 0.01 g AOT (Dispersion 2).

Dispersions (1) and (2) are mixed in varying amounts and their colour coordinates measured using an X-rite Color i5 spectrophotometer, specular excluded, D65, 50 micron test cells with ITO layer. Data are shown in Table 3.

Figure 6:
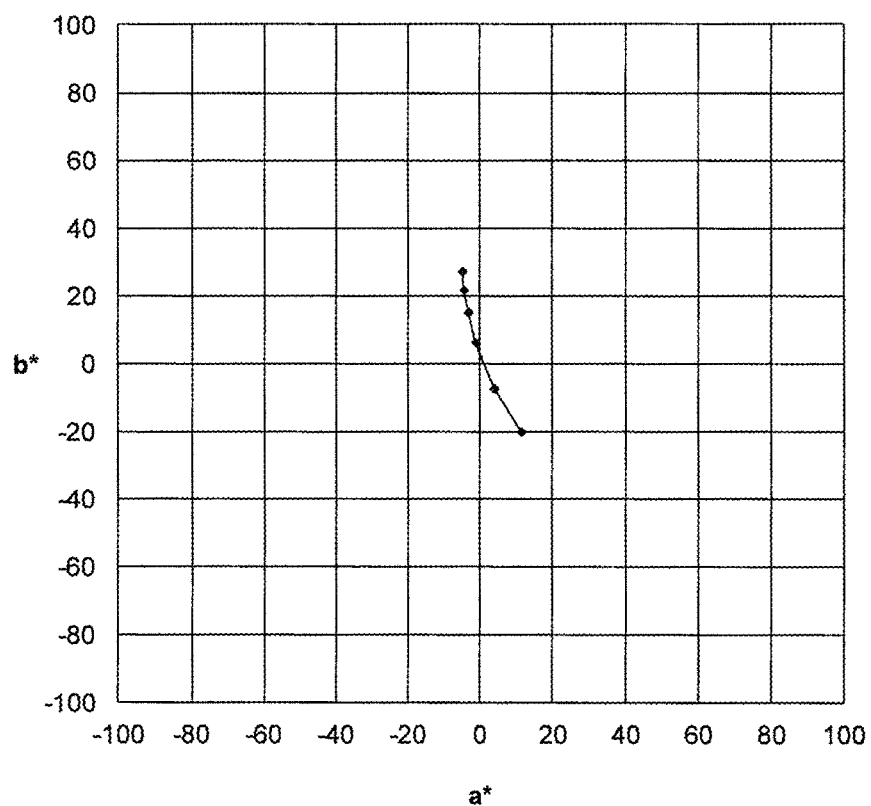
FIG. 6 shows the changes in colour coordinates with increasing/decreasing yellow particle concentration.

FIG. 6 shows the change in colour coordinate with increasing yellow particle concentration. The black particle colour coordinate is biased towards blue/magenta. As the yellow particle concentration is increased, the colour coordinate shifts towards the yellow. A neutral 0,0 black point is achievable with the correct composition. From FIG. 6 this composition can be estimated as being approximately 0.5 g of black dispersion mixed with 0.15 g of yellow dispersion.

TABLE 3

| Weight of Dispersion (1) = Black (g) | Weight of Dispersion (2) = Yellow (g) | X | Y | Z | x | y | L* | a* | b* |
|---|---|---|---|---|---|---|---|---|---|
| 0.4996 | 0.0547 | 2.321 | 1.925 | 5.328 | 0.2424 | 0.2011 | 15.09 | 11.18 | −19.91 |
| 0.5085 | 0.1142 | 2.4 | 2.339 | 3.587 | 0.2883 | 0.2809 | 17.17 | 3.82 | −7.23 |
| 0.5005 | 0.2076 | 2.889 | 3.122 | 2.439 | 0.3419 | 0.3695 | 20.53 | −1.28 | 6.32 |
| 0.5035 | 0.3011 | 3.775 | 4.22 | 2.161 | 0.3717 | 0.4155 | 24.39 | −3.35 | 15.21 |
| 0.5002 | 0.4001 | 4.768 | 5.413 | 2.091 | 0.3885 | 0.4411 | 27.88 | −4.58 | 21.83 |
| 0.5124 | 0.5132 | 5.573 | 6.347 | 1.949 | 0.4018 | 0.4577 | 30.27 | −5.04 | 27.21 |

Zeta potential and electrophoretic mobility is measured using Malvern NanoZS Zetasizer equipment, to confirm no significant differences in particle behaviour. The particles are dispersed in dodecane with Span85 as a stabilising agent. The values are shown in Table 4 and agree within experimental error.

TABLE 4

| Particle | Zeta Potential (mV) | Electrophoretic Mobility $m^2/Vs \times 10^{-10}$ |
|---|---|---|
| Black particles | +35.5 | 3.3 |
| Yellow particles | +33.3 | 3.1 |
| 50:50 mix of Black/Yellow | +32.1 | 3.0 |

Example 5

Preparation of a Dispersion of a Black/Yellow/White Multiparticle Fluid Showing Dual States (Black/White)

1.6 g of black particles of Example 1, 0.7 g of yellow particles of Example 3-c, 0.4 g of AOT are dispersed in 20.0 g of dodecane. To this dispersion, 4.6 g of white particles of Example 2 and 0.7 g of Span85 are added and the dispersion was left on a roller mixer for 30 minutes.

A Nikon LV-100 microscope is used to image the particle movement. By moving the particles between two inplane electrodes, and recording the images, the different coloured particles can be individually observed, and the electrophoretic mobility of all particles can be approximated. The black and yellow particles move at the same speed and the macroscopic impression is of a black/white fluid and no blue/magenta or yellow colour is detectable by eye.

The colour data for the 2 extreme states (Black/White) are measured using an Xrite Color i5 spectrophotometer, specular excluded, D65, 50 micron test cells with ITO layer (see Table 5). There is no significant deviation from neutral black and white states.

TABLE 5

| Colour State | X | Y | Z | x | y | L* | a* | b* |
|---|---|---|---|---|---|---|---|---|
| Black | 2.2 | 2.197 | 2.682 | 0.3107 | 0.3104 | 16.49 | 2.56 | -2.46 |
| White | 28.159 | 30.227 | 34.107 | 0.3044 | 0.3268 | 61.85 | -1.96 | -2.27 |

Figure 7:
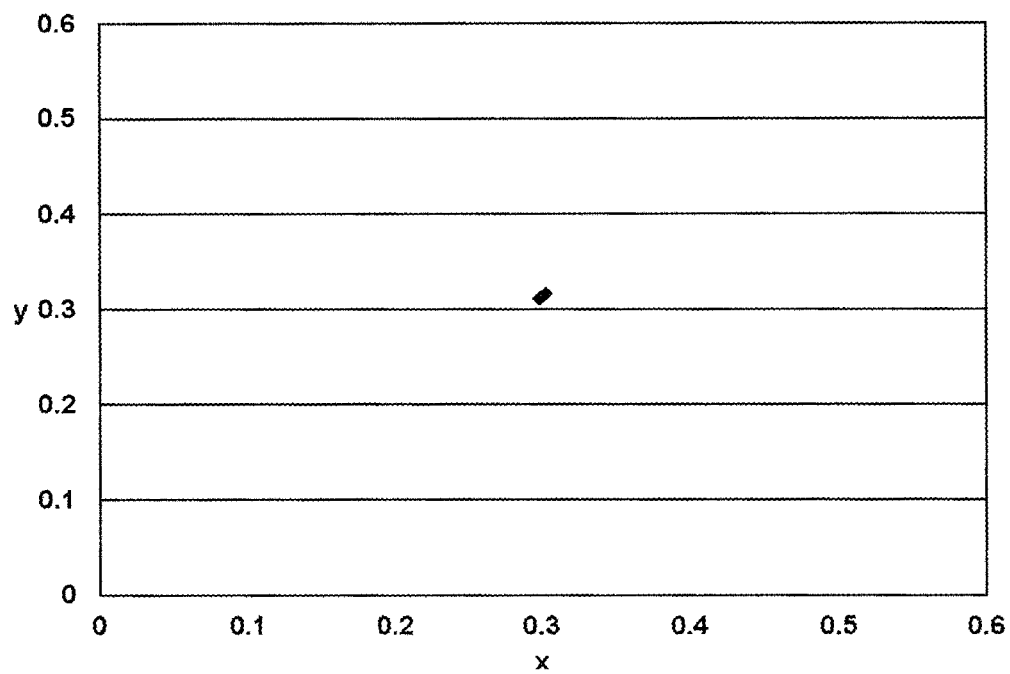
Figure 8:
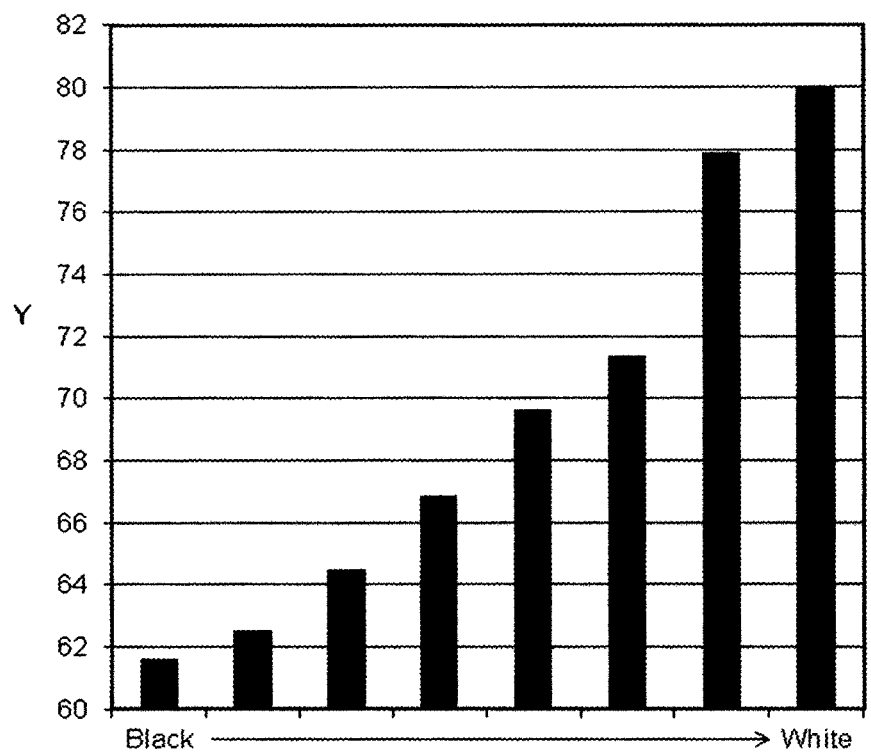

The e/o properties of the mixed dispersion are evaluated using an Autronics DMS-301 display measurement system to measure the luminance change as a voltage is applied, and to measure the response time, using 50 micron test cells with ITO layer. An optimum contrast ratio of >10:1 is achieved, with response times <400 ms at 30V. This performance is adequate for EPD applications and proves the suitability of the concept for EPD applications. To confirm the purity of colour during switching, reflectivity data is measured during switching using an Ocean-Optics USB4000 spectrophotometer. It is confirmed that there is no significant change in x,y coordinate as the cell is switched from black to white and vice versa (i.e. only the Luminance and Y value changes). This data is shown in FIGS. 7 and 8.

Example 6

Preparation of a Black "Single Particle-Type" Electrophoretic Fluid Using 3 Particles. (Using Cyan/Magenta/Yellow Particles)

0.78 g of cyan particles of Example 3-a, 0.36 g of magenta particles of Example 3-b, and 0.41 g of yellow particles of Example 3-c are dispersed in 2.5 g dodecane in the presence of 1.56 g AOT and left on a roller mixer for 30 minutes. The colour coordinates of the dispersion are measured using an X-rite Color i5 spectrophotometer, specular excluded, D65, 50 micron test cells with ITO layer (see Table 6).

TABLE 6

| Colour State | X | Y | Z | x | y | L* | a* | b* |
|---|---|---|---|---|---|---|---|---|
| Cyan + Magenta + yellow mixture | 0.421 | 0.406 | 0.257 | 0.3887 | 0.3747 | 3.67 | 1.49 | 2.6 |

Zeta potential and electrophoretic mobility was measured using Malvern NanoZS Zetasizer equipment, to confirm no significant differences in particle behaviour. The particles were diluted with an AOT/dodecane solution for measurement (see Table 7).

TABLE 7

| Particle | Zeta Potential | Electrophoretic Mobility $m^2/Vs \times 10^{-10}$ |
|---|---|---|
| Cyan particles | -75.3 | 6.98 |
| Magenta particles | -74.6 | 6.92 |
| Yellow particles | -84.5 | 7.83 |

Example 7

Preparation of a Dispersion of a Cyan/Magenta/Yellow/White Multiparticle Fluid Showing Dual States (Black/White)

The particle dispersion from Example 6 is mixed with a dispersion of 1.4 g white particles of Example 2, 0.36 g of Span85 in 2.5 g of dodecane and left on a roller mixer for 30 minutes.

The particles are evaluated using a Nikon LV-100 microscope, under reflective Darkfield illumination to show that the cyan, magenta and yellow particles all behave as a single particle of opposite charge to the white particles. The macroscopic impression is of a black/white fluid and no cyan, magenta or yellow colour is detectable by eye.

The colour data for the 2 extreme states (Black/White) are measured using an Xrite Color i5 spectrophotometer, specular excluded, D65, 50 micron test cells with ITO layer, applying +/−30V (see Table 8).

TABLE 8

| Colour State | X | Y | Z | x | y | L* | a* | b* |
|---|---|---|---|---|---|---|---|---|
| Black | 2.22 | 2.29 | 2.68 | 0.3092 | 0.3180 | 15.10 | 0.61 | −0.79 |
| White | 30.00 | 32.52 | 37.08 | 0.3012 | 0.3265 | 57.03 | −2.85 | −1.85 |

The e/o properties of the mixed dispersion are evaluated using an Autronics DMS-301 display measurement system to measure the luminance change as a voltage is applied, and to measure the response time, using 50 micron test cells with ITO layer. An optimum contrast ratio of >30:1 is achieved, with response times <750 ms at 35V. This performance is adequate for EPD applications and proves the suitability of the concept for EPD applications. To confirm the purity of colour during switching, reflectivity data is measured during switching using an Ocean-Optics USB4000 spectrophotometer. It is confirmed that there is no significant change in x,y coordinate as the cell is switched from black to white and vice versa. (i.e. only the Luminance and Y value changes) (see FIGS. 9 and 10).

Example 8

Preparation of a Magenta "Single Particle-Type" Electrophoretic Fluid Using 2 Particles. (Tuning of the Magenta Colour State)

0.2 g of magenta(1) particles of example 3b and 0.2 g of magenta(2) particles of example 3-b' are dispersed in 2.0 g dodecane in the presence of 0.01 g AOT and left on a roller mixer for 30 minutes.

The colour coordinates of the dispersion are measured using an X-rite Color i5 spectrophotometer, specular excluded, D65, 50 micron test cells with ITO layer (see Table 9 and FIG. 11).

TABLE 9

| Colour State | X | Y | Z | x | y | L* | a* | b* |
|---|---|---|---|---|---|---|---|---|
| Magenta (1) | 9.394 | 4.156 | 2.345 | 0.5910 | 0.2614 | 24.18 | 58.18 | 13.36 |
| Magenta (2) | 10.42 | 4.283 | 12.161 | 0.3879 | 0.1594 | 24.59 | 64.56 | −26.81 |
| Example 5 mixture | 9.124 | 3.901 | 4.955 | 0.5075 | 0.2170 | 23.34 | 59.56 | −3.92 |

Example 9

Preparation of a Green "Single Particle-Type" Electrophoretic Fluid Using 2 Particles. (Mixing of Cyan and Yellow Particles)

Figure 12:
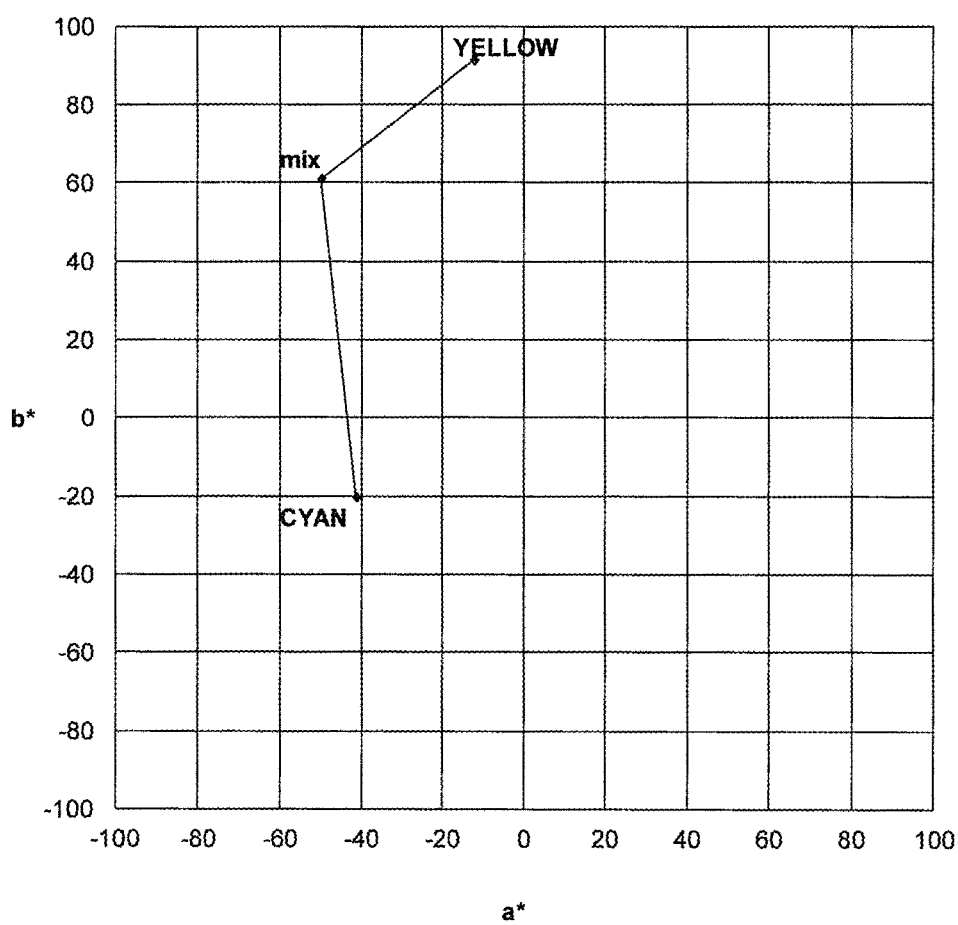

0.2 g of cyan particles of Example 3-a and 0.2 g of yellow particles of Example 3-c are dispersed in 2.0 g dodecane in the presence of 0.01 g A-OT and left on a roller mixer for 30 minutes. The colour coordinates of the dispersion are measured using an X-rite Color i5 spectrophotometer, specular excluded, D65, 50 micron test cells with ITO layer (see Table 10 and FIG. 12).

TABLE 10

| Colour State | X | Y | Z | x | y | L* | a* | b* |
|---|---|---|---|---|---|---|---|---|
| Cyan particles | 21.734 | 33.497 | 54.051 | 0.1989 | 0.3065 | 64.56 | −41.24 | −20.23 |
| Yellow particles | 44.181 | 51.115 | 4.318 | 0.4435 | 0.5131 | 76.75 | −12.14 | 91.38 |
| Mixture (Green) | 21.579 | 35.827 | 7.114 | 0.3344 | 0.5553 | 66.39 | −49.84 | 61.1 |

A Nikon LV-100 microscope is used to image the particle movement to confirm that there is no distinguishable difference in particle behaviour and the macroscopic appearance is that of a single green particle.

Example 10

Preparation of a Red "Single Particle-Type" Electrophoretic Fluid Using 2 Particles. (Mixing of Yellow and Magenta Particles)

Figure 13:
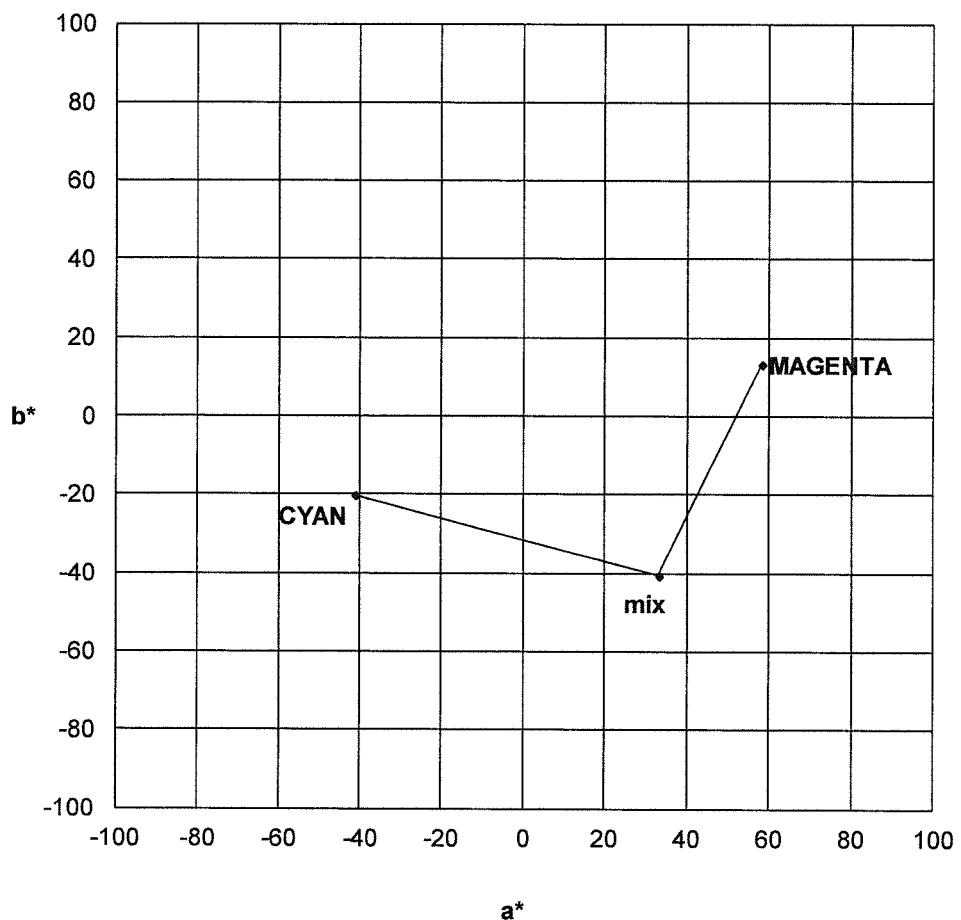

0.2 g of cyan particles of Example 3-c and 0.2 g of magenta particles of Example 3-b are dispersed in 2.0 g dodecane in the presence of 0.01 g AOT and left on a roller mixer for 30 minutes. The colour coordinates of the dispersion are measured using an X-rite Color i5 spectrophotometer, specular excluded, D65, 50 micron test cells with ITO layer (see Table 11 and FIG. 13).

TABLE 11

| Colour State | X | Y | Z | x | y | L* | a* | b* |
|---|---|---|---|---|---|---|---|---|
| Yellow particles | 44.181 | 51.115 | 4.318 | 0.4435 | 0.5131 | 76.75 | −12.14 | 91.38 |
| Magenta particles | 9.394 | 4.156 | 2.345 | 0.5910 | 0.2614 | 24.18 | 58.18 | 13.36 |
| Mixture (red) | 12.918 | 6.363 | 0.259 | 0.6611 | 0.3256 | 30.31 | 57.67 | 48.5 |

A Nikon LV-100 microscope is used to image the particle movement to confirm that there is no distinguishable difference in particle behaviour and the macroscopic appearance is that of a single red particle.

Example 11

Preparation of a Blue "Single Particle-Type" Electrophoretic Fluid Using 2 Particles. (Mixing of Cyan and Magenta Particles)

Figure 14:
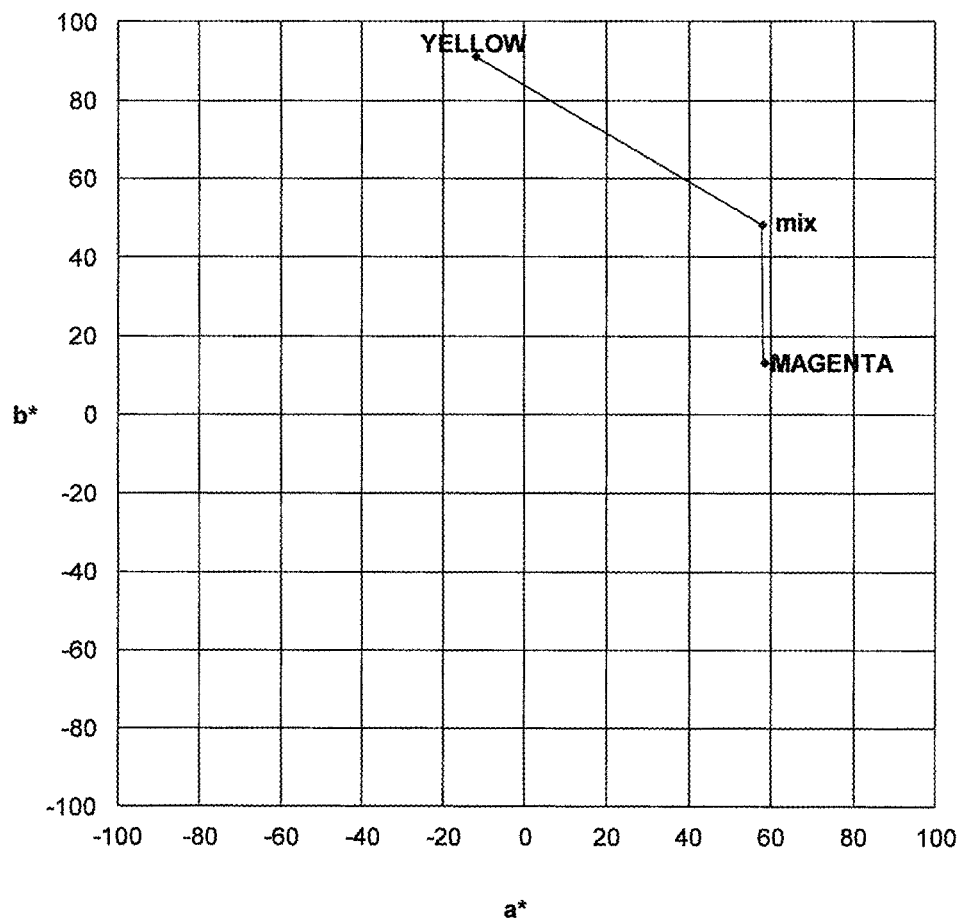

0.3 g of cyan particles of example 3-a and 0.1 g of magenta particles of Example 3-b are dispersed in 2.0 g dodecane in the presence of 0.01 g AOT and left on a roller mixer for 30 minutes. The colour coordinates of the dispersion are measured using an X-rite Color i5 spectrophotometer, specular excluded, D65, 50 micron test cells with ITO layer (see Table 12 and FIG. 14).

TABLE 12

| Colour State | X | Y | Z | x | y | L* | a* | b* |
|---|---|---|---|---|---|---|---|---|
| Cyan particles | 21.734 | 33.497 | 54.051 | 0.1989 | 0.3065 | 64.56 | −41.24 | −20.23 |
| Magenta particles | 9.394 | 4.156 | 2.345 | 0.5910 | 0.2614 | 24.18 | 58.18 | 13.36 |
| Mixture (blue) | 7.084 | 4.468 | 18.67 | 0.2344 | 0.1478 | 25.16 | 33.17 | −40.68 |

A Nikon LV-100 microscope is used to image the particle movement to confirm that there is no distinguishable difference in particle behaviour and the macroscopic appearance is that of a single blue particle.

Example 12

Figure 15:
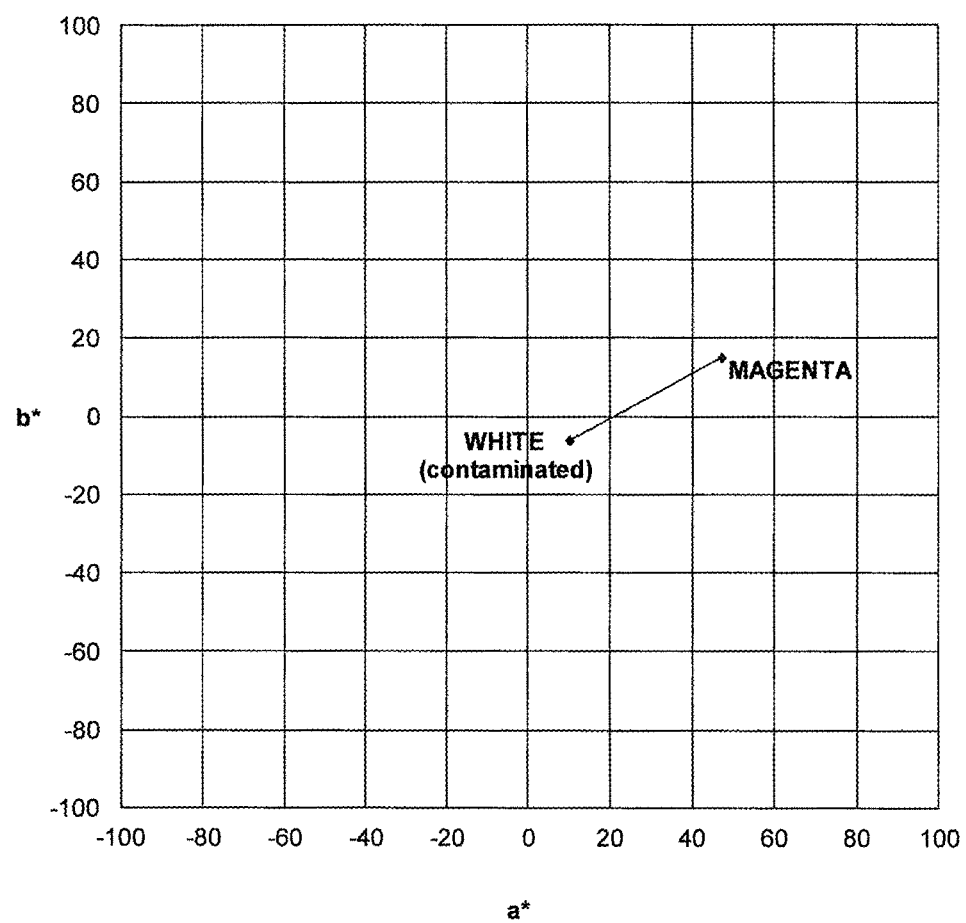

Magenta and White Dual Particle Fluid with Contaminated White State 0.06 g of magenta particles of Example 3-b, 0.06 g of white particles of Example 2, 0.008 g of AOT, 0.02 g of Span 85, are dispersed in 0.35 g of dodecane to form an electrophoretic dispersion reference (Dispersion 3) and left on a roller mixer for 30 minutes. The colour coordinates of the dispersion states are measured by applying +/− 30V and using an X-rite Color i5 spectrophotometer, specular excluded, D65, 50 micron test cells with ITO layer to measure the individual states (see Table 13 and FIG. 15).

Although the contrast ratio and response time of the above fluid are suitable for electrophoretic displays, the white state shows some contamination of colour, and is shifted towards the magenta.

To resolve this, green particles of the same sign charge as the whites can be added.

TABLE 13

| Colour state | X | Y | Z | x | y | L* | a* | b* |
|---|---|---|---|---|---|---|---|---|
| Magenta | 5.373 | 2.438 | 1.073 | 0.6048 | 0.2744 | 17.63 | 47.08 | 14.9 |
| White | 22.502 | 21.53 | 26.956 | 0.317 | 0.3033 | 53.52 | 9.9 | −6.33 |

Example 13

Figure 16:
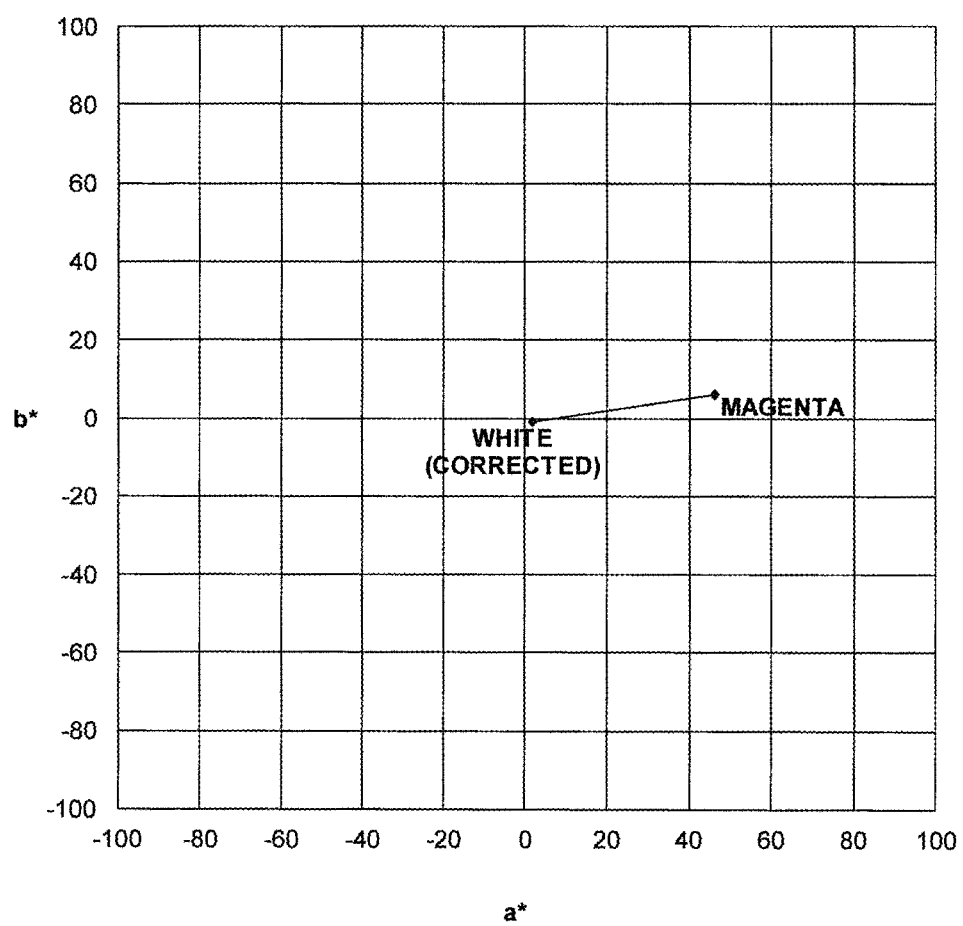

Preparation of a Multiparticle Electrophoretic Fluid with Adjusted White State 0.05 g of green particles of Example 3-g are added to 1.0 g of Dispersion 3 (Example 12) and left on a roller mixer for 30 mins. The colour coordinates of the dispersion states are measured by applying +/− 30V and using an X-rite Color i5 spectrophotometer, specular excluded, D65, 50 micron test cells with ITO layer to measure the individual states (see Table 14 and FIG. 16).

TABLE 14

| Colour state | X | Y | Z | x | y | L* | a* | b* |
|---|---|---|---|---|---|---|---|---|
| Magenta | 5.333 | 2.471 | 1.896 | 0.5498 | 0.2547 | 17.79 | 45.95 | 6.16 |
| White | 20.096 | 20.874 | 22.915 | 0.3146 | 0.3267 | 52.81 | 1.52 | −0.9 |

Figure 17:
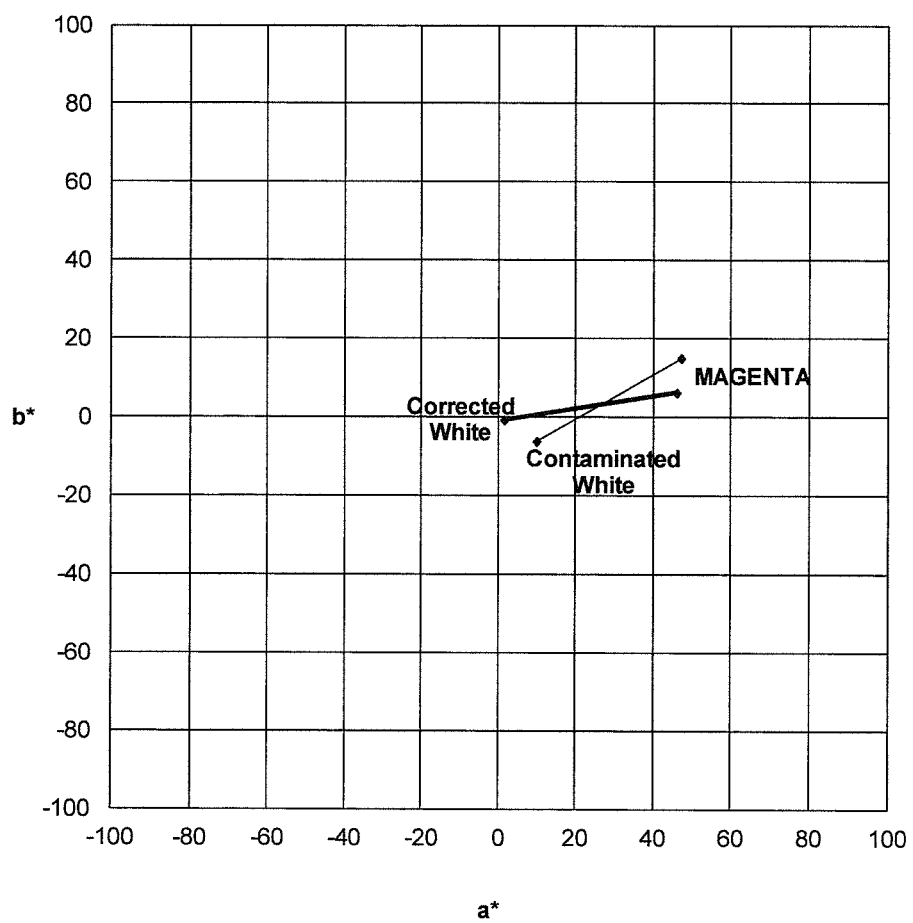

Further comparison of Examples 12 and 13 is shown in Table 15 and FIG. 17. Effect on contrast ratio is minimal, but the neutrality of the white state is significantly improved.

TABLE 15

| Ref | Y (white) | Y (Magenta) | CR (Y) | L* (White) | a* (White) | b* (white) |
|---|---|---|---|---|---|---|
| Example 12 | 21.53 | 2.44 | 8.8:1 | 53.52 | 9.9 | −6.33 |
| Example 13 | 20.87 | 2.47 | 8.4:1 | 52.81 | 1.52 | −0.9 |

Example 14

Preparation of Colour Gamut Sets Using RGB Particles

Figure 18:
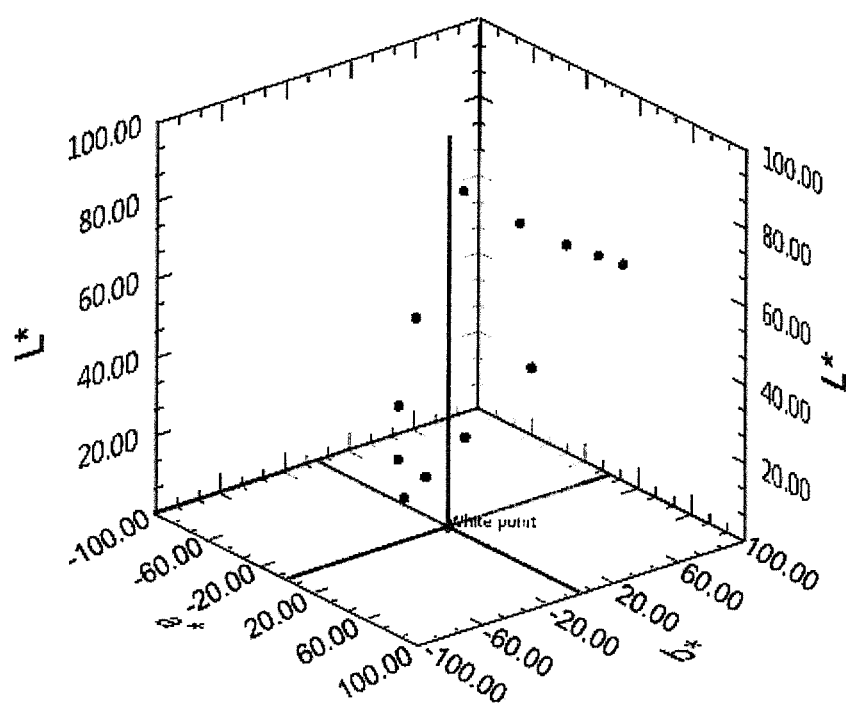
FIG. 18 shows a 3D representation of the colour gamut formed by a particle mixture.

Red particles of Example 3-d, green particles of Example 3-e, and blue particles of Example 3-f are mixed in varying concentration ratios 0.5:1, 1:1, 1:0.5, and the colour coordinates measured of each formulation (see Table 16 and FIG. 18). FIG. 18 shows a 3 D representation of the colour gamut formed by the mixtures. Any colour inside this triangle can be achieved by mixing of the particles. In all cases, the mixed particles behave as a single particle. This example demonstrates that a large number of colours can be achieved with a base of just 3 particles.

TABLE 16

| Colour 1 (ratio) | Colour 2 (ratio) | X | Y | Z | x | y | L* | a* | b* |
|---|---|---|---|---|---|---|---|---|---|
| Green (1.0) | — | 51.467 | 59.066 | 44.779 | 0.3314 | 0.3803 | 81.33 | −11.64 | 18.35 |
| Green (1.0) | Red (0.5) | 44.94 | 45.537 | 20.226 | 0.4059 | 0.4113 | 73.24 | 5.17 | 39.2 |
| Green (1.0) | Red (1.0) | 40.907 | 37.223 | 8.666 | 0.4713 | 0.4289 | 67.44 | 18.14 | 57.42 |
| Red (1.0) | Green (0.5) | 39.320 | 33.200 | 4.331 | 0.5116 | 0.432 | 64.32 | 26.65 | 69.88 |
| Red (1.0) | — | 38.225 | 30.331 | 2.19 | 0.5403 | 0.4287 | 61.94 | 33.43 | 79.72 |
| Red (1.0) | Blue (0.5) | 13.898 | 11.251 | 3.493 | 0.4852 | 0.3928 | 40 | 22.26 | 32.7 |
| Red (1.0) | Blue (1.0) | 6.138 | 4.907 | 6.207 | 0.3558 | 0.2844 | 26.47 | 17.71 | −4.13 |
| Blue (1.0) | Red (0.5) | 4.476 | 3.193 | 11.615 | 0.2321 | 0.1656 | 20.8 | 22.08 | −31.86 |
| Blue (1.0) | — | 5.486 | 3.173 | 22.593 | 0.1755 | 0.1015 | 20.72 | 35.11 | −55.67 |
| Blue (1.0) | Green (0.5) | 7.118 | 5.316 | 26.043 | 0.185 | 0.1382 | 27.62 | 22.93 | −49.55 |
| Blue (1.0) | Green (1.0) | 10.447 | 9.822 | 29.733 | 0.2089 | 0.1964 | 37.52 | 9.01 | −38.11 |
| Green (1.0) | Blue (0.5) | 20.927 | 22.96 | 36.325 | 0.2609 | 0.2862 | 55.03 | −3.99 | −16.92 |

The invention claimed is:

1. An electrophoretic fluid comprising a solvent or solvent mixture and at least two sets of colored polymer particles having different colours, wherein the two sets of particles each comprise monomer units with at least one polymerizable dye, and the two sets of colored polymer particles have the same electric charge sign and electrophoretic mobilities within 25% of each other, and wherein the particles of the at least two sets of particles having different colours behave as a single set of particles moving like a single set of particles in an electrical field.

2. The electrophoretic fluid of claim 1, wherein said electrophoretic fluid comprises at least two sets of particles of different colour, and wherein the electrophoretic fluid shows a single colour state.

3. The electrophoretic fluid of claim 1, wherein said electrophoretic fluid comprises at least two particles of different colour, and wherein the electrophoretic fluid shows an adjusted single colour state.

4. The electrophoretic fluid of claim 3, wherein said electrophoretic fluid comprises at least one cyan particle, at least one magenta particle, and at least one yellow particle, to provide black colour, and additionally at least one white particle having the opposite charge sign, wherein the electrophoretic fluid shows a dual black/white state.

5. The electrophoretic fluid of claim 1, wherein said electrophoretic fluid comprises at least one black and at least one yellow particle, and wherein the electrophoretic fluid shows a single black colour state.

6. The electrophoretic fluid of claim 1, wherein said electrophoretic fluid comprises at least one cyan particle, at least one magenta particle, and at least one yellow particle, and wherein the electrophoretic fluid shows a single black colour state.

7. The electrophoretic fluid of claim 1, wherein said electrophoretic fluid comprises at least one surfactant.

8. A mono, bi, or polychromal, electrophoretic display device comprising the electrophoretic fluid of claim 1.

9. An electrophoretic display device comprising the electrophoretic fluid of claim 1.

10. The electrophoretic display device of claim 9, wherein the electrophoretic fluid is applied by a technique selected from inkjet printing, slot die spraying, nozzle spraying, flexographic printing, and any other contact or contactless printing or deposition technique.

11. The electrophoretic fluid of claim 1, wherein the electrophoretic mobilities of the particles of the at least two sets of particles of different colour is within 10% of each other.

12. An electrophoretic fluid comprising a solvent or solvent mixture and at least two sets of colored polymer particles having different colours, wherein the two sets of particles each comprise monomer units with at least one polymerizable dye, and the two sets of colored polymer particles have the same electric charge sign and electrophoretic mobilities within 10% of each other, and wherein the colored polymer particles of the at least two sets of particles having different colours behave as a single set of particles moving like a single set of particles in an electrical field, wherein said electrophoretic fluid comprises at least one cyan particle, at least one magenta particle, and at least one yellow particle, to provide black colour, and additionally at least one white particle having the opposite charge sign, wherein the electrophoretic fluid shows a dual black/white state.

13. A mono, bi, or polychromal, electrophoretic display device comprising the electrophoretic fluid of claim 12.

* * * * *